US012798842B2

(12) United States Patent
Spahlinger

(10) Patent No.: US 12,798,842 B2
(45) Date of Patent: Nov. 17, 2026

(54) TELESCOPING CARTON

(71) Applicant: GPI Frankfurt & Augsburg GmbH, Kriftel (DE)

(72) Inventor: Carolin Spahlinger, Hattersheim am Main (DE)

(73) Assignee: GPI Frankfurt & Augsburg GmbH, Kriftel (DE)

( * ) Notice: Subject to any disclaimer, the term of this patent is extended or adjusted under 35 U.S.C. 154(b) by 88 days.

(21) Appl. No.: 18/728,966

(22) PCT Filed: Feb. 3, 2023

(86) PCT No.: PCT/US2023/012298
§ 371 (c)(1),
(2) Date: Jul. 15, 2024

(87) PCT Pub. No.: WO2023/150283
PCT Pub. Date: Aug. 10, 2023

(65) Prior Publication Data

US 2025/0100763 A1 Mar. 27, 2025

(30) Foreign Application Priority Data

Feb. 4, 2022 (DE) ..................... 20 2022 100 653.9

(51) Int. Cl.
*B65D 50/06* (2006.01)
*B31B 50/26* (2017.01)
*B65D 5/38* (2006.01)

(52) U.S. Cl.
CPC ............ *B65D 50/066* (2013.01); *B31B 50/26* (2017.08); *B65D 5/38* (2013.01); *B65D 2215/02* (2013.01)

(58) Field of Classification Search
CPC . B65D 5/10; B65D 5/38; B65D 5/443; B65D 5/6608; B65D 50/00; B65D 50/02;
(Continued)

(56) References Cited

U.S. PATENT DOCUMENTS 200,401 A 2/1878 Knapp
1,048,577 A 12/1912 Pardoe, Jr.
(Continued)

FOREIGN PATENT DOCUMENTS

AT 334276 B 1/1976
CH 412 695 4/1966
(Continued)

OTHER PUBLICATIONS

International Search Report and Written Opinion for PCT/US2023/012298 dated May 22, 2023.
(Continued)

*Primary Examiner* — Javier A Pagan
(74) *Attorney, Agent, or Firm* — Andrew N. Claerbout; FisherBroyles, LLP

(57) ABSTRACT

A carton comprising an inner construct that can comprise a plurality of inner panels and a first opening for at least partially receiving one or more products. The inner construct can comprise an inner locking tab foldably connected to at least one inner panel. The carton further can comprise an outer construct comprising a plurality of outer panels extending at least partially around at least a portion of the inner construct and a second opening. The outer construct can comprise an outer locking tab foldably connected to at least one outer panel. The inner locking tab and the outer locking tab can cooperate to limit movement between the inner construct and the outer construct. At least the inner locking tab is moveable with respect to the outer locking tab for allowing the inner construct to move from a first position at least partially through the second opening to a second position.

32 Claims, 14 Drawing Sheets

(58) Field of Classification Search
CPC .... B65D 50/04; B65D 50/045; B65D 50/046; B65D 50/066; B65D 2215/02; B31B 50/26
See application file for complete search history.

(56) References Cited

U.S. PATENT DOCUMENTS

| | | | |
|---|---|---|---|
| 1,130,271 | A | 3/1915 | Hammond |
| 1,253,489 | A | 1/1918 | Houghland |
| 1,664,308 | A | 3/1928 | Miller |
| 1,951,274 | A | 3/1934 | Denman |
| 2,054,596 | A | 9/1936 | Ford |
| 2,069,281 | A | 2/1937 | Sebreny |
| 2,180,808 | A | 11/1939 | Jacobstein |
| 2,194,220 | A | 3/1940 | Elder |
| 2,251,283 | A | 8/1941 | Johnson |
| 2,331,754 | A | 10/1943 | Wohlers |
| 2,335,363 | A | 11/1943 | Shelton |
| 2,369,387 | A | 2/1945 | Williamson |
| 2,396,310 | A | 3/1946 | Yungblut |
| 2,474,523 | A | 6/1949 | Reynolds |
| 2,559,320 | A | 7/1951 | Rushing |
| 2,579,346 | A | 12/1951 | Theander |
| 2,610,770 | A | 9/1952 | Penfield |
| 2,745,589 | A | 5/1956 | Daly |
| 2,777,630 | A | 1/1957 | Moberger |
| D179,932 | S | 3/1957 | Currie |
| D179,933 | S | 3/1957 | Currie |
| 2,836,343 | A | 5/1958 | Will |
| 2,877,736 | A | 3/1959 | Simmons |
| 2,898,004 | A | 8/1959 | Klausmann et al. |
| 2,899,123 | A | 8/1959 | Currie, Jr. |
| 2,943,769 | A | 7/1960 | Klausmann |
| 2,970,742 | A | 2/1961 | Fleisig |
| 2,975,952 | A | 3/1961 | Tamarin |
| 2,980,540 | A | 4/1961 | Turpin |
| 2,983,424 | A | 5/1961 | Glass |
| 3,033,436 | A | 5/1962 | Peimer |
| 3,040,953 | A | 6/1962 | Tindall |
| 3,049,282 | A | 8/1962 | Chidsey, Jr. |
| 3,055,362 | A | 9/1962 | Uytenbogaar |
| 3,057,524 | A | 10/1962 | Shanks |
| 3,071,882 | A | 1/1963 | Eisman |
| 3,099,381 | A | 7/1963 | Meyers |
| 3,114,474 | A | 12/1963 | Davis |
| 3,116,007 | A | 12/1963 | Esposito |
| 3,166,229 | A | 1/1965 | Sherman et al. |
| 3,187,961 | A | 6/1965 | Moore |
| 3,205,603 | A | 9/1965 | Brumley |
| 3,235,144 | A | 2/1966 | Pitkin et al. |
| 3,240,419 | A | 3/1966 | Spiering |
| 3,269,531 | A | 8/1966 | Weiss |
| 3,298,576 | A | 1/1967 | Sellors |
| 3,302,847 | A | 2/1967 | Hennesey |
| 3,310,222 | A | 3/1967 | Buttery |
| 3,347,446 | A | 10/1967 | Guyer et al. |
| 3,366,496 | A | 1/1968 | Bomar |
| RE26,557 | E | 3/1969 | Houston |
| 3,441,002 | A | 4/1969 | Lawalin et al. |
| 3,512,699 | A | 5/1970 | Wilson |
| 3,533,547 | A | 10/1970 | Houston |
| 3,563,449 | A | 2/1971 | Forbes, Jr. |
| 3,692,231 | A | 9/1972 | Neitzke |
| 3,741,387 | A | 6/1973 | Whitecar |
| 3,804,321 | A | 4/1974 | Forbes, Jr. |
| 3,831,833 | A | 8/1974 | Dressler et al. |
| 3,888,350 | A | 6/1975 | Horvath |
| 3,894,680 | A | 7/1975 | Araki |
| 3,894,681 | A | 7/1975 | Arneson |
| 3,899,121 | A | 8/1975 | Herbetko |
| 3,910,487 | A | 10/1975 | Jaeschke |
| 3,921,862 | A | 11/1975 | Holmstrom |
| 3,958,744 | A | 5/1976 | Herglotz |
| 3,971,505 | A | 7/1976 | Ohkubo |
| 3,981,434 | A | 9/1976 | Ramich |
| 4,004,691 | A | 1/1977 | Wihksne |
| 4,053,100 | A | 10/1977 | Baptist |
| 4,076,117 | A | 2/1978 | Wisdom |
| 4,081,128 | A | 3/1978 | O'Neill |
| 4,083,455 | A | 4/1978 | Keating, Jr. |
| 4,094,456 | A | 6/1978 | Raccoforte |
| 4,102,457 | A | 7/1978 | Meyers |
| 4,111,351 | A | 9/1978 | Forbes, Jr. |
| 4,113,086 | A | 9/1978 | Forbes, Jr. |
| 4,138,016 | A | 2/1979 | Roccaforte |
| 4,141,485 | A | 2/1979 | Lambert |
| 4,155,449 | A | 5/1979 | Bryne |
| 4,196,483 | A | 4/1980 | Kahl, Jr. |
| 4,196,843 | A | 4/1980 | Garmon |
| 4,197,985 | A | 4/1980 | Austin |
| 4,201,329 | A | 5/1980 | Rccaforte |
| 4,261,483 | A | 4/1981 | Dutcher |
| 4,279,373 | A | 7/1981 | Montealgre |
| 4,304,355 | A | 12/1981 | Sykora |
| 4,341,338 | A | 7/1982 | Arnold |
| 4,342,417 | A | 8/1982 | Forbes, Jr. |
| 4,361,270 | A | 11/1982 | Roccaforte |
| 4,401,210 | A | 8/1983 | Anjou |
| 4,441,648 | A | 4/1984 | Portsmouth |
| 4,472,896 | A | 9/1984 | Brauner |
| 4,531,669 | A | 7/1985 | Osborne |
| 4,550,834 | A | 11/1985 | Fletcher |
| 4,609,142 | A | 9/1986 | Adamek |
| 4,630,733 | A | 12/1986 | Fear |
| 4,684,023 | A | 8/1987 | Cortopassi |
| 4,717,070 | A | 1/1988 | Tabug |
| 4,812,704 | A | 3/1989 | Van Der Ven |
| 4,834,255 | A | 5/1989 | Boots |
| 4,892,247 | A | 1/1990 | Dirksing |
| 4,901,457 | A | 2/1990 | Chandler |
| 5,040,722 | A | 8/1991 | Fromion |
| 5,050,794 | A | 9/1991 | Wischusen |
| D320,743 | S | 10/1991 | Alexander |
| 5,056,708 | A | 10/1991 | Boyle et al. |
| 5,058,803 | A | 10/1991 | Gulliver |
| 5,103,972 | A | 4/1992 | Ackeret |
| RE33,979 | E | 6/1992 | Cortopassi |
| 5,154,343 | A | 10/1992 | Stone |
| 5,161,734 | A | 11/1992 | Ruehl |
| 5,205,478 | A | 4/1993 | Wiscusen, III |
| D342,446 | S | 12/1993 | Parker |
| D345,272 | S | 3/1994 | Kelsoe |
| 5,299,732 | A | 4/1994 | Armor |
| D346,552 | S | 5/1994 | Krupa |
| 5,429,297 | A | 7/1995 | Walsh |
| 5,439,133 | A | 8/1995 | Stone |
| 5,450,998 | A | 9/1995 | Esse |
| 5,465,834 | A | 11/1995 | Sieber et al. |
| 5,503,268 | A | 4/1996 | Pham |
| 5,505,374 | A | 4/1996 | Stone |
| 5,511,722 | A | 4/1996 | Dixon |
| 5,515,996 | A | 5/1996 | Stone |
| 5,518,172 | A | 5/1996 | Nanno |
| 5,538,133 | A | 7/1996 | Campbell |
| 5,542,540 | A | 8/1996 | Knapp |
| 5,551,938 | A | 9/1996 | Stone |
| 5,627,150 | A | 5/1997 | Peterson |
| 5,628,533 | A | 5/1997 | Hill |
| D379,759 | S | 6/1997 | Mulry |
| 5,662,265 | A | 9/1997 | Jensen |
| 5,690,273 | A | 11/1997 | Jensen |
| 5,697,549 | A | 12/1997 | Yocum |
| D389,739 | S | 1/1998 | Auclair |
| 5,725,144 | A | 3/1998 | Stone et al. |
| 5,772,030 | A | 6/1998 | Baxter |
| 5,810,250 | A | 9/1998 | Stone et al. |
| 5,826,781 | A | 10/1998 | Jensen |
| 5,875,962 | A | 3/1999 | Jorgensen-Beck et al. |
| 5,875,963 | A | 3/1999 | Stone |
| D418,052 | S | 12/1999 | Scrimger |
| 6,027,018 | A | 2/2000 | Yocum |
| 6,041,997 | A | 3/2000 | Jensen |
| 6,047,829 | A | 4/2000 | Johnstone |
| 6,068,181 | A | 5/2000 | Cai |

(56) References Cited

U.S. PATENT DOCUMENTS

| | | | |
|---|---|---|---|
| 6,105,774 | A | 8/2000 | Jackson |
| 6,105,855 | A | 8/2000 | Kackstetter |
| 6,138,904 | A | 10/2000 | Baird |
| D437,222 | S | 2/2001 | Goldberg |
| 6,213,388 | B1 | 4/2001 | Ours et al. |
| 6,230,893 | B1 | 5/2001 | Karow |
| 6,296,175 | B1 | 10/2001 | Dixon |
| 6,318,593 | B1 | 11/2001 | Laughlin et al. |
| D458,127 | S | 6/2002 | De Groote |
| D460,691 | S | 7/2002 | Morris |
| 6,412,636 | B1 | 7/2002 | Jones |
| 6,484,931 | B1 | 11/2002 | Hofte |
| D467,499 | S | 12/2002 | Garza |
| 6,491,211 | B1 | 12/2002 | Evans |
| D472,463 | S | 4/2003 | Kinigakis |
| D473,787 | S | 4/2003 | William |
| 6,575,299 | B1 | 6/2003 | Kinigakis |
| 6,604,676 | B2 | 8/2003 | Giblin |
| 6,641,031 | B2 | 11/2003 | Evans |
| D484,043 | S | 12/2003 | Hwang |
| 6,672,474 | B2 | 1/2004 | May |
| 6,681,983 | B2 | 1/2004 | Bill-Moore |
| 6,708,874 | B1 | 3/2004 | Montgomery |
| 6,749,108 | B2 | 6/2004 | Naughton |
| 6,752,272 | B2 | 6/2004 | Jones |
| D499,022 | S | 11/2004 | Sun |
| 6,945,449 | B2 | 9/2005 | Hengami |
| 6,957,765 | B2 | 10/2005 | Howell |
| 7,156,286 | B2 | 1/2007 | Hengami |
| 7,353,969 | B2 | 4/2008 | McHutchinson |
| 7,367,453 | B2 | 5/2008 | Sutherland |
| 7,377,385 | B2 | 5/2008 | Giannini |
| 7,389,875 | B2 | 6/2008 | Sandberg |
| 7,473,215 | B2 | 1/2009 | Moen |
| 7,503,475 | B2 | 3/2009 | McGowan |
| 7,523,825 | B2 | 4/2009 | Velazquez |
| 7,637,375 | B2 | 12/2009 | Sattel |
| 7,658,318 | B2 | 2/2010 | Walsh |
| 7,708,142 | B2 | 5/2010 | Ehrlund |
| 7,726,552 | B2 | 6/2010 | Chadima |
| 7,841,512 | B2 | 11/2010 | Westerman |
| 7,854,325 | B2 | 12/2010 | Bentele |
| 8,056,799 | B2 | 11/2011 | Burke |
| 8,443,978 | B2 | 5/2013 | Royer |
| 8,453,840 | B2 | 6/2013 | Wharton |
| 8,740,050 | B2 | 6/2014 | Zinck |
| 8,746,444 | B2 | 6/2014 | Dehlin |
| 8,800,855 | B2 | 8/2014 | Fitzwater |
| 8,997,979 | B2 | 4/2015 | Ghini |
| 9,359,123 | B2 | 6/2016 | Bhattacharjee |
| 9,475,605 | B2 | 10/2016 | Everett |
| 9,783,335 | B2 | 10/2017 | Everett |
| D805,898 | S | 12/2017 | Holley, Jr. |
| 9,881,788 | B2 | 1/2018 | Kim |
| 9,981,788 | B2 | 5/2018 | Skinner |
| 10,017,291 | B2 | 7/2018 | Smith |
| 10,053,259 | B2 | 8/2018 | Gungner |
| 10,086,972 | B2 | 10/2018 | Hajek |
| 10,124,944 | B2 | 11/2018 | Smalley |
| 10,232,976 | B2 | 3/2019 | Waddington |
| 10,301,091 | B2 | 5/2019 | Ramsuer |
| 10,442,600 | B2 | 10/2019 | Waltermire |
| 10,479,581 | B2 | 11/2019 | Chambers |
| 10,486,849 | B2 | 11/2019 | Parkes |
| 10,494,138 | B1 | 12/2019 | Velliquette |
| 10,618,684 | B2 | 4/2020 | Eckert |
| 10,661,940 | B2 | 5/2020 | Hajek |
| D899,245 | S | 10/2020 | Mori |
| 10,934,072 | B2 | 3/2021 | Lantz |
| D921,982 | S | 6/2021 | Gerhards |
| 11,046,476 | B2 | 6/2021 | Whitehurst |
| 11,059,621 | B2 | 7/2021 | Nowak |
| 11,365,022 | B2 | 6/2022 | Altman |
| 11,794,947 | B2 | 10/2023 | Hoefte |
| 11,932,468 | B2 | 3/2024 | Hoefte |

| | | | |
|---|---|---|---|
| 11,993,434 | B2 | 5/2024 | Hoefte |
| 12,012,262 | B2 | 6/2024 | Zirollo |
| 12,116,184 | B2 | 10/2024 | Hoefte |
| 12,134,503 | B2 | 11/2024 | Hoefte |
| 12,162,651 | B2 | 12/2024 | Hoefte |
| 12,473,118 | B2 | 11/2025 | Kavanagh |
| 12,497,225 | B2 | 12/2025 | Thompson |
| 12,570,434 | B2 | 3/2026 | Spahlinger |
| 2002/0052302 | A1 | 5/2002 | Clark |
| 2003/0047595 | A1 | 3/2003 | Bill-Moore |
| 2003/0111523 | A1 | 6/2003 | Haugan |
| 2003/0168502 | A1 | 9/2003 | Kisch |
| 2003/0213722 | A1 | 11/2003 | Kinigakis |
| 2003/0222130 | A1 | 12/2003 | Fukushima |
| 2004/0065723 | A1 | 4/2004 | Hengami |
| 2004/0074953 | A1 | 4/2004 | Yocum |
| 2004/0099565 | A1 | 5/2004 | Dehlin |
| 2004/0188300 | A1 | 9/2004 | Sutherland |
| 2005/0017061 | A1 | 1/2005 | Quaintance |
| 2006/0118451 | A1 | 6/2006 | Edwards |
| 2006/0283928 | A1 | 12/2006 | Walsh |
| 2007/0221713 | A1 | 9/2007 | Wilson |
| 2007/0267467 | A1 | 11/2007 | Burke |
| 2008/0054059 | A1 | 3/2008 | Chadima |
| 2008/0217204 | A1 | 9/2008 | Sattel |
| 2008/0217205 | A1 | 9/2008 | Sattel |
| 2008/0257773 | A1 | 10/2008 | Gelardi |
| 2008/0265010 | A1 | 10/2008 | Montague Kisch |
| 2009/0001145 | A1 | 1/2009 | Hasse |
| 2009/0032575 | A1 | 2/2009 | D Amato |
| 2009/0152134 | A1 | 6/2009 | Katsis |
| 2009/0184022 | A1 | 7/2009 | Coe |
| 2011/0168767 | A1 | 7/2011 | Hengami |
| 2011/0204087 | A1 | 8/2011 | Kopulos |
| 2013/0193197 | A1 | 8/2013 | Low |
| 2013/0256391 | A1 | 10/2013 | Jolley |
| 2013/0306718 | A1 | 11/2013 | Sumpmann |
| 2013/0313311 | A1 | 11/2013 | Fath et al. |
| 2014/0339293 | A1 | 11/2014 | McLeod |
| 2014/0346220 | A1 | 11/2014 | Saulas |
| 2015/0034711 | A1 | 2/2015 | Pinkstone |
| 2015/0060537 | A1 | 3/2015 | Hajek et al. |
| 2015/0083789 | A1 | 3/2015 | Fitzwater et al. |
| 2015/0183548 | A1 | 7/2015 | Cho |
| 2015/0197386 | A1 | 7/2015 | Chang |
| 2015/0232785 | A1 | 8/2015 | Paullin |
| 2015/0267155 | A1 | 9/2015 | Brooker |
| 2016/0096650 | A1 | 4/2016 | Jamison |
| 2016/0122445 | A1 | 5/2016 | Nambiar |
| 2016/0152373 | A1 | 6/2016 | Linssen |
| 2016/0251107 | A1 | 9/2016 | Everett |
| 2016/0264286 | A1 | 9/2016 | Pinkstone |
| 2017/0001751 | A1 | 1/2017 | Ishikawa |
| 2017/0001752 | A1 | 1/2017 | Ishikawa |
| 2017/0008664 | A1 | 1/2017 | Parkes |
| 2017/0036808 | A1 | 2/2017 | Everett |
| 2017/0062023 | A1 | 3/2017 | Datta |
| 2017/0298308 | A1 | 10/2017 | Labeque |
| 2017/0334600 | A1 | 11/2017 | Eckert et al. |
| 2018/0022498 | A1 | 1/2018 | Everett |
| 2018/0099775 | A1 | 4/2018 | Van Waarden |
| 2018/0215513 | A1 | 8/2018 | Perek |
| 2018/0257827 | A1 | 9/2018 | Drosos |
| 2018/0265816 | A1 | 9/2018 | Lintula |
| 2018/0346846 | A1 | 12/2018 | Kropf |
| 2019/0023448 | A1 | 1/2019 | Mehta |
| 2019/0062023 | A1 * | 2/2019 | Lantz ................. B65D 77/0433 |
| 2019/0084740 | A1 * | 3/2019 | Davis ...................... A61J 1/035 |
| 2019/0135503 | A1 | 5/2019 | De Wilde |
| 2019/0136153 | A1 | 5/2019 | Dicosimo |
| 2019/0202942 | A1 | 7/2019 | Lu |
| 2019/0291917 | A1 | 9/2019 | Curcic |
| 2019/0344925 | A1 | 11/2019 | Block |
| 2019/0390138 | A1 | 12/2019 | Sivik |
| 2020/0002646 | A1 | 1/2020 | Huang |
| 2020/0087020 | A1 * | 3/2020 | Tsai ....................... B65D 59/04 |
| 2020/0180808 | A1 | 6/2020 | Cauvin |
| 2020/0189813 | A1 * | 6/2020 | Drosos ............... B65D 83/0463 |
| 2020/0331667 | A1 | 10/2020 | Bressan |

(56) References Cited

U.S. PATENT DOCUMENTS

| | | | | |
|---|---|---|---|---|
| 2020/0339303 | A1 | 10/2020 | Zeiler | |
| 2021/0016939 | A1 | 1/2021 | Palmer | |
| 2021/0047072 | A1 | 2/2021 | Ng Pak Leung | |
| 2021/0053715 | A1 | 2/2021 | Tsai | |
| 2021/0171235 | A1 | 6/2021 | Boland | |
| 2021/0269191 | A1 | 9/2021 | Peterson et al. | |
| 2021/0292056 | A1 | 9/2021 | Tidwell | |
| 2021/0347524 | A1 | 11/2021 | Hoefte | |
| 2022/0063877 | A1 | 3/2022 | Forenza | |
| 2022/0081155 | A1 | 3/2022 | Hoefte | |
| 2022/0144507 | A1 | 5/2022 | Ubell | |
| 2022/0169426 | A1 | 6/2022 | Drosos | |
| 2022/0185534 | A1 | 6/2022 | Hoefte | |
| 2022/0204210 | A1 * | 6/2022 | Joines | B65D 5/38 |
| 2022/0250788 | A1 | 8/2022 | Bressan | |
| 2022/0289425 | A1 | 9/2022 | Green | |
| 2022/0289436 | A1 | 9/2022 | Hoefte | |
| 2022/0306336 | A1 | 9/2022 | Bressan | |
| 2022/0315297 | A1 | 10/2022 | Zirollo | |
| 2022/0332460 | A1 | 10/2022 | Bressan | |
| 2022/0380097 | A1 | 12/2022 | Li | |
| 2023/0015201 | A1 | 1/2023 | Arango | |
| 2023/0110630 | A1 | 4/2023 | Hoefte | |
| 2023/0113321 | A1 | 4/2023 | Bressan | |
| 2023/0132541 | A1 | 5/2023 | Hoefte | |
| 2023/0142224 | A1 | 5/2023 | Buck | |
| 2023/0249870 | A1 | 8/2023 | Huang | |
| 2023/0264852 | A1 | 8/2023 | Hoefte | |
| 2023/0264853 | A1 | 8/2023 | Hoefte | |
| 2023/0286695 | A1 | 9/2023 | Hoefte | |
| 2023/0322455 | A1 | 10/2023 | Beelen | |
| 2023/0415950 | A1 | 12/2023 | Mack et al. | |
| 2024/0010385 | A1 | 1/2024 | Spahlinger | |
| 2024/0017874 | A1 | 1/2024 | Spahlinger | |
| 2024/0025607 | A1 | 1/2024 | Bressan | |
| 2024/0067388 | A1 | 2/2024 | Kavanagh | |
| 2024/0067392 | A1 | 2/2024 | Spahlinger | |
| 2024/0158131 | A1 | 5/2024 | Waddington | |
| 2024/0278968 | A1 | 8/2024 | Thompson | |
| 2024/0327063 | A1 | 10/2024 | Bressan | |
| 2025/0100763 | A1 | 3/2025 | Spahlinger | |
| 2025/0145327 | A1 | 5/2025 | Oliveira | |
| 2025/0153891 | A1 | 5/2025 | Ng Pak Leung | |

FOREIGN PATENT DOCUMENTS

| | | | |
|---|---|---|---|
| CH | 534616 | | 3/1973 |
| CH | 681293 | | 2/1993 |
| CH | 710519 | A2 | 6/2016 |
| CN | 1968856 | A | 5/2007 |
| CN | 105209590 | | 12/2015 |
| CN | 109071064 | | 12/2018 |
| CN | 110817035 | A | 2/2020 |
| CN | 112498895 | A | 3/2021 |
| DE | 9214914 | U1 | 1/1993 |
| DE | 202020106481 | | 2/2022 |
| DE | 102020129814 | | 5/2022 |
| EP | 0571711 | A2 | 12/1993 |
| EP | 0679581 | | 11/1995 |
| EP | 1783058 | A1 | 5/2007 |
| EP | 1783058 | | 4/2010 |
| EP | 2594507 | A1 | 5/2013 |
| EP | 2808265 | A1 | 12/2014 |
| EP | 2512938 | B1 | 6/2017 |
| EP | 3261941 | | 1/2018 |
| EP | 3587293 | A1 | 1/2020 |
| EP | 3 623 308 | A1 | 3/2020 |
| EP | 3753856 | A1 | 12/2020 |
| EP | 3 871 989 | | 9/2021 |
| EP | 3978380 | | 4/2022 |
| EP | 4 039 606 | | 8/2022 |
| EP | 4163219 | | 4/2023 |
| EP | 4245676 | | 9/2023 |
| EP | 4 269 264 | | 11/2023 |
| EP | 15091757 | | 2/2025 |
| FR | 2820718 | A1 | 8/2002 |
| GB | 385033 | | 12/1932 |
| GB | 2256425 | A | 12/1992 |
| GB | 2358391 | | 7/2001 |
| IT | 202100000638 | A1 | 7/2022 |
| JP | 52022499 | Y2 | 5/1977 |
| JP | S5222499 | | 5/1977 |
| JP | S54142223 | | 10/1979 |
| JP | H03639 | | 1/1991 |
| JP | H11049151 | A | 2/1999 |
| JP | 2002029536 | A | 1/2002 |
| JP | 2002-145256 | A | 5/2002 |
| JP | 2005528296 | A | 9/2005 |
| JP | 2006290413 | A | 10/2006 |
| JP | 2009161222 | A | 7/2009 |
| JP | 2010126185 | A | 6/2010 |
| JP | 4536881 | B2 | 9/2010 |
| JP | 2011140318 | A | 7/2011 |
| JP | 2011-173640 | A | 9/2011 |
| JP | 2011-189978 | A | 9/2011 |
| JP | 2013531589 | | 8/2013 |
| JP | 2017-007691 | A | 1/2017 |
| JP | 2017-131364 | | 8/2017 |
| JP | 2017171364 | A * | 9/2017 |
| JP | 2018009176 | | 1/2018 |
| JP | 6298245 | B2 | 3/2018 |
| JP | 2018076095 | A | 5/2018 |
| JP | 3216684 | | 6/2018 |
| KR | 200310542 | Y1 | 4/2003 |
| KR | 10-0906301 | B1 | 7/2009 |
| NL | 100017 | | 12/1961 |
| TW | 201444743 | A | 12/2014 |
| WO | WO 03/101840 | A1 | 12/2003 |
| WO | 2008038189 | | 4/2008 |
| WO | WO 2008/054305 | A1 | 5/2008 |
| WO | 2010015638 | | 2/2010 |
| WO | 2010085471 | | 7/2010 |
| WO | 2011012863 | A1 | 2/2011 |
| WO | 2011154822 | | 12/2011 |
| WO | 2013076012 | A1 | 5/2013 |
| WO | 2016138305 | A1 | 9/2016 |
| WO | 2018022493 | A1 | 2/2018 |
| WO | 2019094406 | A1 | 5/2019 |
| WO | WO 2019/236830 | A1 | 12/2019 |
| WO | WO 2020/052911 | A1 | 3/2020 |
| WO | 2021013515 | | 1/2021 |
| WO | WO 2021/044266 | A1 | 3/2021 |
| WO | WO 2022/101339 | A1 | 5/2022 |
| WO | 2022173680 | A1 | 8/2022 |
| WO | WO 2023/150283 | A1 | 8/2023 |
| WO | WO 2024/049779 | A1 | 3/2024 |

OTHER PUBLICATIONS 12 x 12 x 6" Kraft Tab Locking Literature Mailers S-16934—Uline. Date first available: Dec. 1, 2020. Site visited: Mar. 4, 2025. Available online: https://www.uline.com/Product/Detail/S-16934/Indestructo-and-Literature-Mailers/12-x-12-x-6- Kraft-Tab-Locking-Literature-Mailers, Year: 2020, (pp. 1-1).

Custom Corrugated Boxes | Flip Top Storage Box | CustomBoxline. Date first available: Sep. 22, 2021. Site visited: Mar. 4, 2025. Available online: https://www.customboxline.com/producUcustom-corrugated-boxes-flip-top-storage-box, Year: 2021, (pp. 1-6).

Strength Packaging | Graphic Packaging International. Date first available: Mar. 31, 2024. Site visited: Mar. 4, 2025. Available online: https://www.graphicpkg.com/solutions/packaging-solutions/strength-packaging/, Year: 2024, (pp. 1-10).

International Search Report for PCT/US2025/020619, dated Jul. 4, 2025.

Extended European Search Report issued in App No. EP23750213 dated Nov. 11, 2025, 15 pages.

International Search Report and Written Opinion for PCT/US2024/016419 dated Jun. 5, 2024 (pp. 1-11).

Office Action (Notice of Allowance and Fees Due (PTOL-85)) dated Nov. 12, 2025 for U.S. Appl. No. 18/239,188 (pp. 1-8).

Extended European Search Report issued in App. No. EP23861160, dated Jun. 17, 2026 (pp. 1-8).

(56) References Cited

OTHER PUBLICATIONS

Graphicpackaging_Wrap-Style Multipack Cartons, Date Not Available, [online], [site visited Feb. 5, 2026]. Available from internet, URL: htp://www.graphicpg.com/wrap-style-multiack-cartons-forfood-and-beverage-applications/ (Year 2026).
International Search Report and Written Opinion for PCT/US2023/026994 dated Oct. 26, 2023, 11 pages.
Notice of Allowance dated May 22, 2026 for U.S. Appl. No. 29/957,943 (pp. 1-6).
Office Action (Final Rejection) dated May 1, 2026 for U.S. Appl. No. 18/509,612 (pp. 1-9).
Office Action (Non-Final Rejection) dated Jan. 8, 2026 for U.S. Appl. No. 18/220,881 (pp. 1-7).
Office Action (Non-Final Rejection) dated Feb. 27, 2026 for U.S. Appl. No. 18/941,443 (pp. 1-17).
Office Action (Non-Final Rejection) dated Mar. 9, 2026 for U.S. Appl. No. 18/036,248 (pp. 1-6).
Office Action (Non-Final Rejection) dated Jun. 2, 2026 for U.S. Appl. No. 19/024,918 (pp. 1-17).
Office Action (Non-Final Rejection) dated Dec. 23, 2025 for U.S. Appl. No. 18/509,612 (pp. 1-21).
Office Action (Notice of Allowance and Fees Due (PTOL-85)) dated Jun. 15, 2026 for U.S. Appl. No. 18/218,757 (pp. 1-8).
Office Action (Notice of Allowance and Fees Due (PTOL-85)) dated Jun. 16, 2026 for U.S. Appl. No. 18/220,881 (pp. 1-9).
Office Action dated Feb. 19, 2026 for U.S. Appl. No. 29/957,943 (pp. 1-6).

* cited by examiner

TELESCOPING CARTON

CROSS-REFERENCE TO RELATED APPLICATIONS

This application claims the benefit of German Utility Model application No. 202022100653.9, filed on Feb. 4, 2022.

INCORPORATION BY REFERENCE

The disclosure of German Utility Model application No. 202022100653.9, which was filed on Feb. 4, 2022, is hereby incorporated by reference for all purposes as if presented herein in its entirety.

BACKGROUND OF THE DISCLOSURE

The present disclosure generally relates to cartons/boxes for holding one or more products. More specifically, the present disclosure relates to a carton with an inner construct at least partially within an outer construct and with locking features for selectively limiting relative movement between the constructs of the carton.

Telescoping cartons/boxes can be used for a wide variety of different products, such as dishwasher tabs, medicines, household cleaners, candles, cosmetics, tobacco, and other products that should be kept out of the hands of children, as they may put the products in their mouths, swallow them, or use them in other dangerous ways. In examples, one may want to keep certain products out of the reach of toddlers, kindergarten children, and children of preschool age, i.e., up to about the age of six, for example.

SUMMARY OF THE DISCLOSURE

In general, one aspect of the disclosure is directed to a carton comprising an inner construct that can comprise a plurality of inner panels extending at least partially around an interior of the inner construct and a first opening for at least partially receiving one or more products in the interior of the inner construct. The inner construct can comprise an inner locking tab foldably connected to at least one inner panel of the plurality of inner panels. The carton further can comprise an outer construct comprising a plurality of outer panels extending at least partially around at least a portion of the inner construct and a second opening. The outer construct can comprise an outer locking tab foldably connected to at least one outer panel of the plurality of outer panels. The inner locking tab and the outer locking tab can cooperate to limit movement between the inner construct and the outer construct. At least the inner locking tab is moveable with respect to the outer locking tab for allowing the inner construct to move relative to the outer construct from a first position at least partially through the second opening to a second position.

In another aspect, the disclosure is generally directed to, in combination, a first blank and a second blank for cooperating to at least partially form a carton. The first blank can comprise a plurality of inner panels and an inner locking tab foldably connected to at least one inner panel of the plurality of inner panels. The first blank can be for forming an inner construct with a first opening for at least partially receiving one or more products in an interior of the inner construct formed from the first blank. The second blank can comprise a plurality of outer panels and an outer locking tab foldably connected to at least one outer panel of the plurality of outer panels. The second blank can be for forming an outer construct with the plurality of outer panels at least partially extending around the inner construct formed from the first blank, and the outer construct formed from the second blank can comprise a second opening. The inner locking tab and the outer locking tab can be configured for selectively cooperating to limit movement between the inner construct formed from the first blank and the outer construct formed from the second blank when the carton is formed from the first blank and the second blank.

In another aspect, the disclosure is generally directed to a method of forming a carton. The method can comprise obtaining a first blank comprising a plurality of inner panels and an inner locking tab foldably connected to at least one inner panel of the plurality of inner panels. The method further can comprise forming an inner construct from the first blank by folding the plurality of inner panels at least partially around an interior of the inner construct. The inner construct comprises a first opening for at least partially receiving one or more products in the interior of the inner construct. The method can comprise obtaining a second blank comprising a plurality of outer panels and an outer locking tab foldably connected to at least one outer panel of the plurality of outer panels. The method further can comprise forming an outer construct from the second blank by folding the plurality of outer panels at least partially around the inner construct. The outer construct can comprise a second opening. The inner locking tab and the outer locking tab can cooperate to limit movement between the inner construct and the outer construct. At least the inner locking tab is moveable with respect to the outer locking tab for allowing the inner construct to move relative to the outer construct from a first position at least partially through the second opening to a second position.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION OF THE EXEMPLARY EMBODIMENTS

The present disclosure generally relates to constructs, boxes, cartons, carriers, trays, or the like, and packages for holding one or more products or articles such as those that should be kept out of the hands of children (e.g., for safety reasons). The product or products can be cleaning products such as dishwasher tabs, household cleaners, soaps, and the like; medicines; cosmetics; candles; tobacco; objects that may pose a choking hazard; any other suitable product or material; or combinations thereof.

Constructs according to the present disclosure can accommodate product or articles of any shape. In this specification, the terms "inner," "interior," "outer," "exterior," "lower," "bottom," "upper," and "top" indicate orientations determined in relation to fully erected and upright constructs and cartons. As described herein, constructs can be formed from blanks by being glued with multiple panels, portions, tabs, and/or flaps, which may be designated herein in terms relative to one another, e.g., "first", "second", "third", etc., in sequential or nonsequential reference, without departing from the disclosure.

Figure 1:
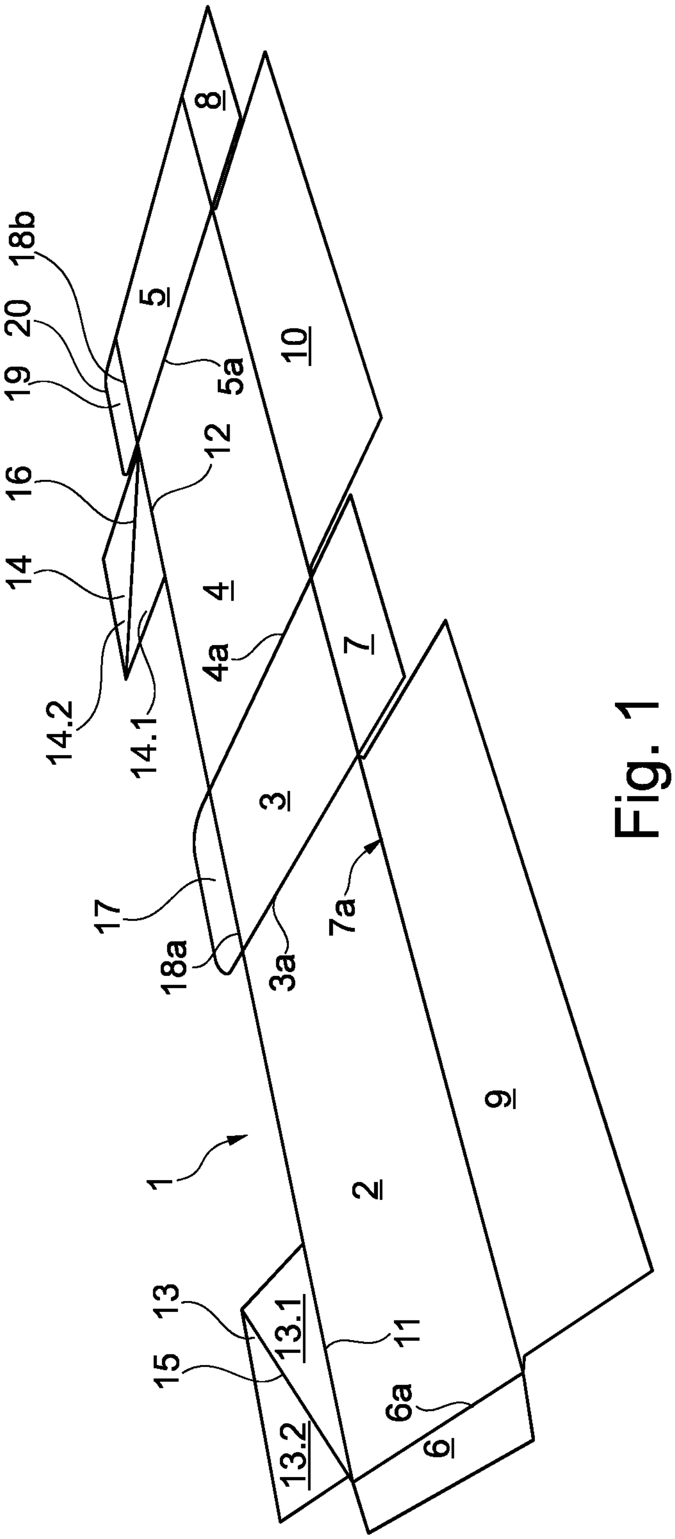
FIG. 1 is a view of a first blank for forming an inner construct according to exemplary embodiments of the disclosure.

According to FIG. 1, a first blank 1 is used to form an inner part or inner construct 27 (FIGS. 3, 6-8, and 11-14) with a first opening 26 according to exemplary embodiments of the disclosure. The inner construct 27 can be a container used to hold one or more products (not shown). FIG. 4 illustrates a second blank 28 used to form an outer part or outer construct 57 (e.g., a cover 57) (FIGS. 9-14) with a second opening 58 according to exemplary embodiments of the disclosure. In embodiments, the inner (interior) construct 27 and the outer (exterior) construct 57 cooperate to form a carton 59 (FIGS. 9-14) with the outer construct 57 extending at least partially around the inner construct 27 and the inner construct being selectively movable within the outer construct between a first position (FIGS. 9-12) and a second position (FIGS. 13 and 14), as described in more detail below. In the illustrated embodiments, the inner construct 27 and the outer construct 57 can include locking and stop features for cooperating to limit movement of the inner construct 27 relative to the outer construct 57, as described in more detail below. In exemplary embodiments, the blanks 1, 28 can be made of paperboard, cardboard, corrugated cardboard, or other suitable material.

As shown in FIG. 1, the first blank 1 can have four first side walls or inner panels 2, 3, 4, 5, which are foldably connected to each other at their lateral edges via respective fold lines 3*a*, 4*a*, 5*a*. The inner panel 2 is foldably connected at a lateral edge with a first (inner) adhesive tab or attachment flap 6 along a lateral fold line 6*a*. In embodiments, the fold lines 3*a*, 4*a*, 5*a*, 6*a* can be perpendicular to the grain direction of the first blank 1, which can facilitate the formation of straight edges of the inner construct 27 formed form the blank 1. The inner panels 3, 5 are each connected at their lower edges via a longitudinal fold line 7*a* to respective bottom dust flaps 7, 8, and the inner panels 2, 4 are foldably connected to respective bottom flaps 9, 10 along the longitudinal fold line 7*a*. Any of the inner panels 2, 3, 4, 5, the attachment flap 6, the bottom dust flaps 7, 8, and/or the bottom flaps 9, 10 could be omitted or could be otherwise shaped, arranged, and/or configured without departing from the disclosure. For example, the attachment flap 6 could be foldably connected to a different one of the inner panels (e.g., the inner panel 5).

In the illustrated embodiments, the inner panels 2, 4 are foldably connected at their upper edges via first folding lines 11, 12 (e.g., longitudinal fold lines 11, 12) to first and second inner locking tabs 13, 14. In embodiments, the first and second inner locking tabs 13, 14 are arranged next to the ends of the two inner panels 2, 4 that are remote from each other in the first blank 1 (e.g., the inner locking tabs 13, 14 are proximate to the respective lateral fold lines 5*a*, 6*a* as shown in FIG. 1). The inner locking tabs 13, 14 each can comprise a respective proximal (first) inner locking portion or panel 13.1, 14.1 and a respective distal (second) outer locking portion or flap 13.2, 14.2, each having the shape of right-angled triangles in the illustrated embodiments and being connected to each other at their long sides via second folding lines 15, 16 (e.g., oblique fold lines 15, 16). In an exemplary embodiment, the second folding lines 15, 16 are inclined at an angle of 45° to the upper edges of the inner panels 2, 4. In embodiments, the inner panel 3 is foldably connected at the upper edge via a (longitudinal) fold line 18*a* to a top dust flap 17 on the first opening 26 side, and the inner panel 5 is foldably connected at the upper edge via a fifth (longitudinal) fold line 18*b* to a top dust flap 19. In the illustrated embodiments, the top dust flap 19 can be an inner (first) stop flap 19, wherein the edge of the first stop flap 19 remote from the fifth fold line 18 forms an inner (first) stop edge 20. Any of the inner locking tabs 13, 14, the top dust flap 17, and/or the inner stop flap 19 could be omitted or could be otherwise shaped, arranged, and/or configured without departing from the disclosure. For example, the inner locking tabs 13, 14 could be foldably connected to the respective inner panels 2, 4 proximate the lateral fold lines 3*a*, 4*a* and the top dust flap 17 could be configured as the inner stop flap with the inner stop edge.

In a first processing step for forming the inner construct 27 from the first blank 1, the proximal inner locking portions 13.1, 14.1 are folded along the first folding lines 11, 12 against the exterior sides of the inner panels 2, 4. In exemplary embodiments, the proximal inner locking portions 13.1, 14.1 can be glued to the respective inner panels 2, 4. Furthermore, the distal inner locking portions 13.2, 14.2 are folded along the second folding lines 15, 16 against the outer sides of the proximal inner locking portions 13.1, 14.1. In exemplary embodiments, the distal inner locking portions 13.2, 14.2 can be glued to the respective proximal inner locking portions 13.1, 14.1 (e.g., along portions that are spaced apart from the second fold lines 15, 16, which can help promote a stronger build-up of the material in the area of the second fold lines 15, 16). In the illustrated embodiments, the inner locking portions 13.1, 13.2, 14.1, 14.2 of the respective inner locking tabs 13, 14 can cooperate to form respective inner locking edges. For example, the edges of the inner locking portions 13.1, 13.2, 14.1, 14.2 that are folded over one another and face the inner panel 3 respectively form the inner locking edges 21, 22 (e.g., see FIGS. 2 and 3). The edges of the inner locking portions 13.1, 13.2, 14.1, 14.2 that are connected to each other via the second folding lines 15, 16 together form respective insertion edges 23, 24, which are oblique and are inclined at an acute angle to the upper edges of the side walls 2, 4 (e.g., see FIGS. 2 and 3).

The inner construct 27 further can be formed by folding the inner attachment flap 6 against the inside of the inner panel 2 and folding the inner panel 3 about its common fold line 4*a* with the side panel 4 so that the inner attachment flap 6 is brought into face-to-face contact with the inner panel 5. In embodiments, the outside of the inner attachment flap 6 is bonded to the inside of the inner panel 5 (e.g., with adhesive). In this pre-glued, flat-lying state or in the flattened state folded along fold lines 3*a*, 5*a* as shown in FIG. 2, the first blank 1 can be stored in stacks and/or delivered from a packaging manufacturer to a packer or other suitable user.

Figure 2:
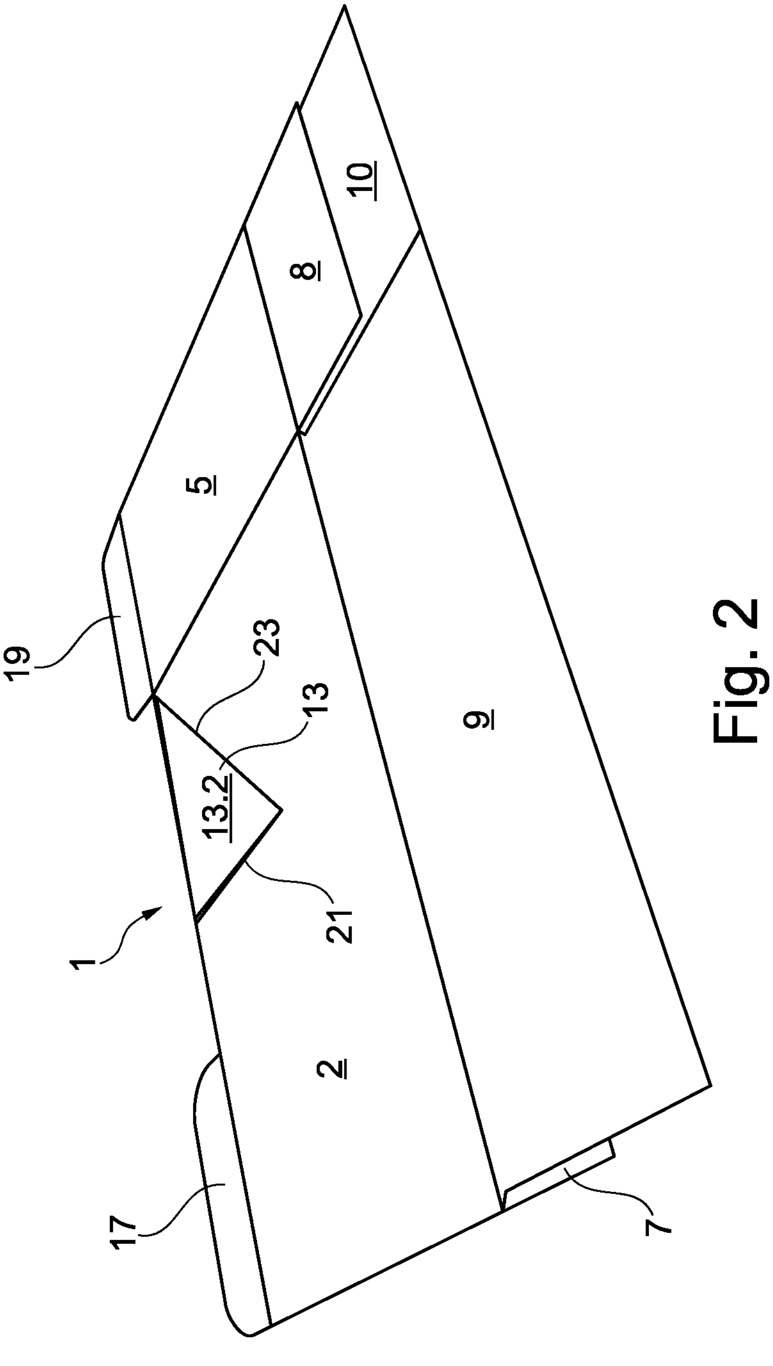
FIG. 2 is a view of a folded first blank formed from the first blank of FIG. 1 according to exemplary embodiments of the disclosure.
Figure 3:
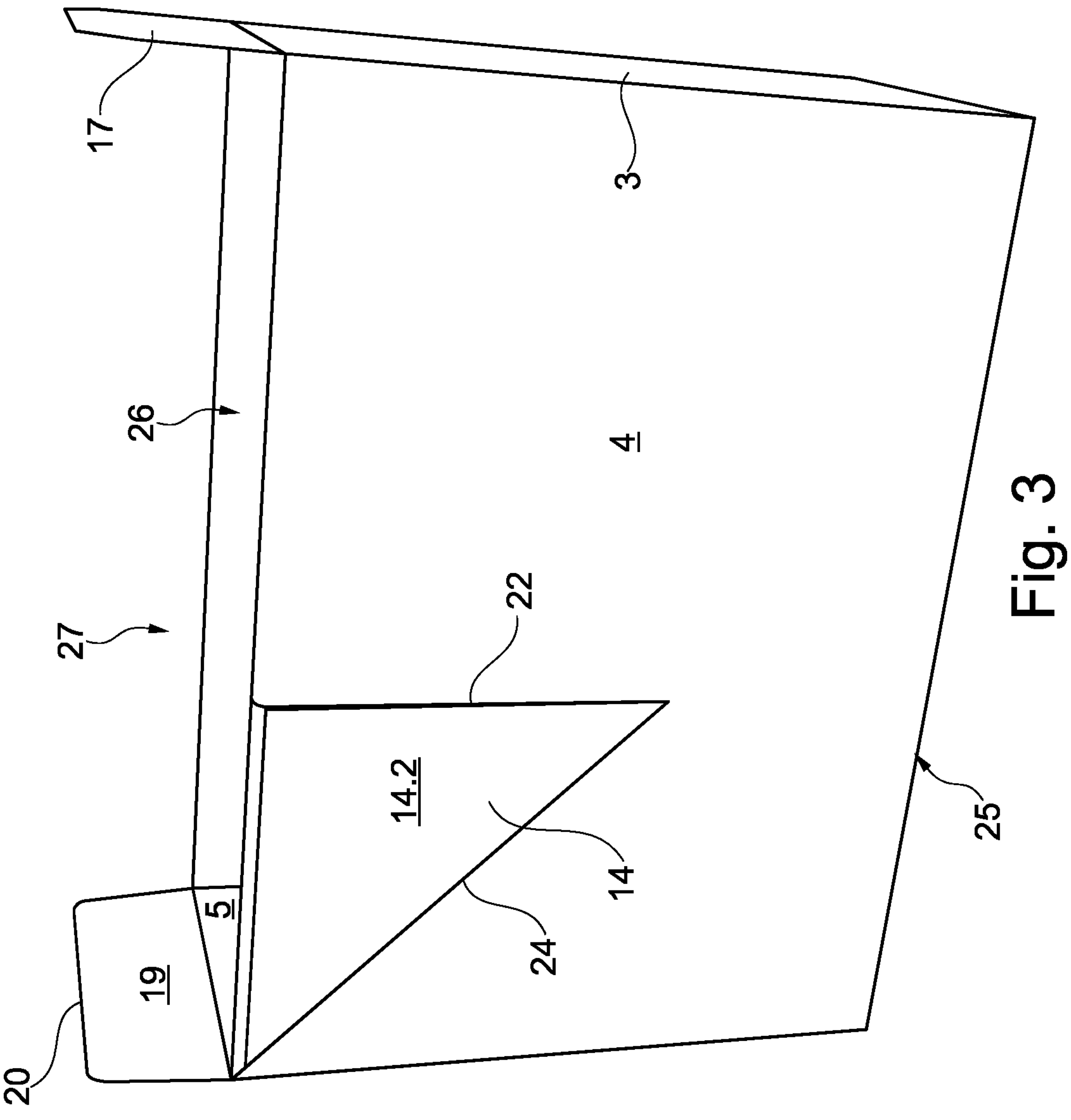
FIG. 3 is a perspective view obliquely from above of the inner construct formed from the first blank of FIG. 1 according to exemplary embodiments of the disclosure.
Figure 4:
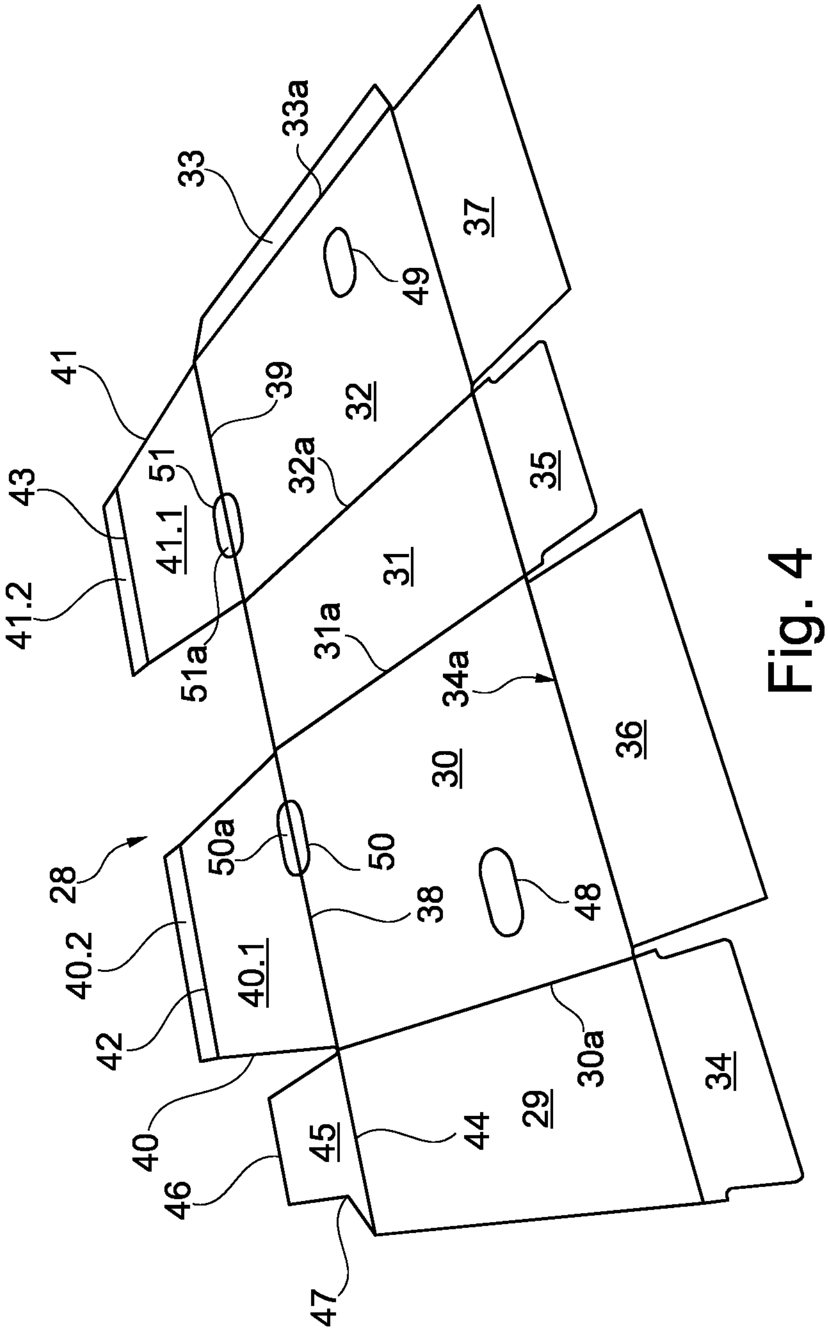
FIG. 4 is a perspective view of a second blank for forming an outer construct according to exemplary embodiments of the disclosure.

In the illustrated embodiments, the pre-glued blank 1 as shown in FIG. 2 can be pressed together slightly at the spaced fold lines 3*a*, 5*a* between the inner panels 2, 3 and 4, 5 until the inner panels 2, 3, 4, 5 adopt the arrangement shown in FIG. 3, extending at least partially around an interior of the inner construct 27. In embodiments, the bottom dust flaps 7, 8 can be folded around the fold line 7*a* at the bottom edges of the inner panels 3, 5 over a bottom opening of the inner construct 27 between the inner panels 2, 3, 4, 5, and the bottom flaps 9, 10 can be folded around the fold line 7*a* at the bottom edges of the inner panels 2, 4 from below against the bottom dust flaps 7, 8 to at least partially close the bottom end of the inner construct 27 and to at least partially form a bottom wall 25 (FIGS. 3 and 14) of the inner construct 27. In exemplary embodiments, the bottom flaps 9, 10 can be glued to the bottom dust flaps 7, 8. In the illustrated embodiments, the upper edges of the side walls 2, 3, 4, 5 extend along and at least partially define the first opening 26 for inserting products into and removing products from the inner construct 27. As shown in FIGS. 2 and 3, the inner locking tabs 13, 14 are foldably connected to the respective inner panels 2, 4 along the first opening 26 (e.g., the fold lines 11, 12 can extend along the first opening 26). In this state, the inner part 27 is shown in FIG. 3. The inner part/construct 27 could be otherwise erected without departing from the disclosure.

According to FIG. 4, the second blank 28 for the outer part/construct 57 comprises four second side walls or outer panels 29, 30, 31, 32 that are foldably connected to each other at their lateral edges via respective fold lines 30*a*, 31*a*, 32*a*. In embodiments, the outer panel 32 is connected at a lateral edge via a lateral fold line 33*a* to a second (outer) adhesive tab or attachment flap 33. In embodiments, the fold lines 30*a*, 31*a*, 32*a*, 33*a* can be perpendicular to the grain direction of the second blank 28, which can facilitate the formation of straight edges of the outer construct 57 formed form the blank 28. As shown in FIG. 4, the outer panels 29, 31 are foldably connected at end face edges via a longitudinal fold line 34*a* to end dust flaps 34, 35 and the outer panels 30, 32 are foldably connected at the end face edges via the longitudinal fold line 34*a* to end flaps 36, 37. Any of the outer panels 29, 30, 31, 32, the attachment flap 33, the end dust flaps 34, 35, and/or the end flaps 36, 37 could be omitted or could be otherwise shaped, arranged, and/or configured without departing from the disclosure. For example, the attachment flap 33 could be foldably connected to a different one of the inner panels (e.g., the inner panel 29).

In the illustrated embodiments, the outer panels 30, 32 are foldably connected to outer interlocking (locking) tabs 40, 41 at edges remote from (opposite to) the end flaps 36, 37 by third fold lines 38, 39 (e.g., longitudinal fold lines 38. 39). In embodiments, the outer locking tabs 40, 41 include proximal outer locking portions or panels 40.1, 41.1 foldably connected to respective distal outer locking portions or flaps 40.2, 41.2 at edges remote from (e.g., spaced apart from, opposite to) the third fold lines 38, 39 via fourth fold lines 42, 43 (e.g., longitudinal fold lines 42, 43). As shown in FIG. 4, the proximal outer locking portions 40.1, 41.1 are foldably connected to the respective outer panels 30, 32 along the longitudinal fold lines 38, 39. In embodiments, the outer panel 29 can be foldably connected to an outer (second) stop flap 45 at the edge remote from (opposite to) the end dust flap 34 via a sixth (longitudinal) fold line 44. The outer stop flap 45 has an outer stop edge 46 at the edge remote from the sixth fold line 44 and a recess 47 at a lateral edge. Any of the outer locking tabs 40, 41 and/or the outer stop flap 45 could be omitted or could be otherwise shaped, arranged, and/or configured without departing from the disclosure.

As shown in FIG. 4, the second blank 28 can include oval or circular first engagement openings (apertures) 48, 49 provided in the outer panels 30, 32, each of which is disposed closer to the respective end flaps 36, 37 than to the respective outer locking tabs 40, 41. Alternatively, the apertures 48, 49 could have any suitable shape. In embodiments, weakening lines 50, 51 (e.g., in the form of interrupted punch lines, tear lines, cut lines, etc.) can be for forming half oval or circular second engagement openings (recesses) 52, 53 (FIGS. 12-14) and can be arranged with one half in the respective outer panels 30, 32 and with the other half in the respective proximal outer locking portion 40.1, 41.1. In the illustrated embodiments, the lines of weakening can at least partially define removable or tear-away panels 50*a*, 51*a*. Any of the apertures 48, 49, the lines of weakening 50, 51, the tear-away panels 50*a*, 51*a*, and/or the recesses 52, 53 could be omitted or could be otherwise shaped, arranged, and/or configured without departing from the disclosure.

Figure 5:
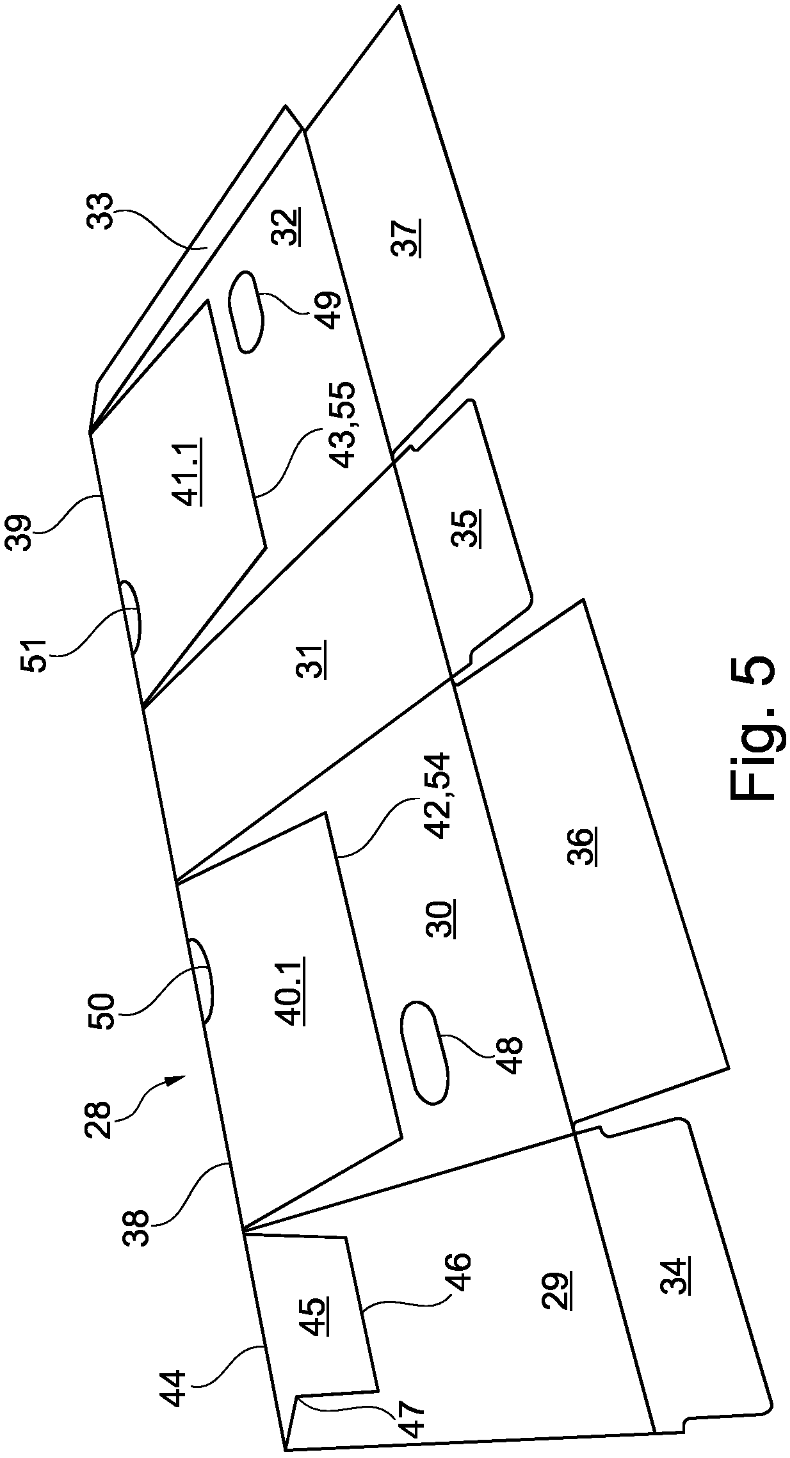
FIG. 5 is a view of a folded second blank formed from the second blank of FIG. 4 according to exemplary embodiments of the disclosure.

According to FIG. 5, in a first processing step for forming the outer construct 57 from the second blank 28, e.g., at a packaging manufacturer, the distal outer locking portions 40.2, 41.2 can be folded against the inner sides of the respective proximal outer locking portions 40.1, 41.1, wherein the outer locking portions 40.2, 41.2 and 40.1, 41.1 can be respectfully glued together, for example. In embodiments, the proximal outer locking portions 40.1, 41.1 can be folded against the inner sides of the outer panels 30, 32 and at least the distal outer locking portions 40.2, 41.2 can be glued to the inner sides of the respective outer panels 30, 32, for example. As shown in FIG. 5, the fourth folding lines 42, 43 can be positioned between the respective first engagement openings 48, 49 and the respective third folding lines 38, 39. In the illustrated embodiments, the fourth fold lines 42, 43 can form outer (second) locking edges 54, 55. In embodiments, since the distal outer locking portions 40.2, 41.2 are folded to be between the respective proximal outer locking portions 40.1, 41.1 and the respective outer panels 30, 32, the outer locking tabs 40, 41 can provide a smooth inner surface for facilitating moving the inner construct 27 inwardly from its second position to its first position as described below. In a further step, the outer stop flap 45 can be folded against the inside of the outer panel 29. In exemplary embodiments, the outer stop flap 45 can be glued/bonded to the outer panel 29 (e.g., to help prevent the outer stop flap 45 from folding downwardly into the first opening 26 where it might interact with product in the inner construct 27 and/or it might not properly interact with the inner stop flap 19 as described below). The second blanks 28, which can be pre-glued and lie flat as shown in FIG. 5, can be stored in stacks on top of one another and/or delivered to a packer, for example.

Figure 6:
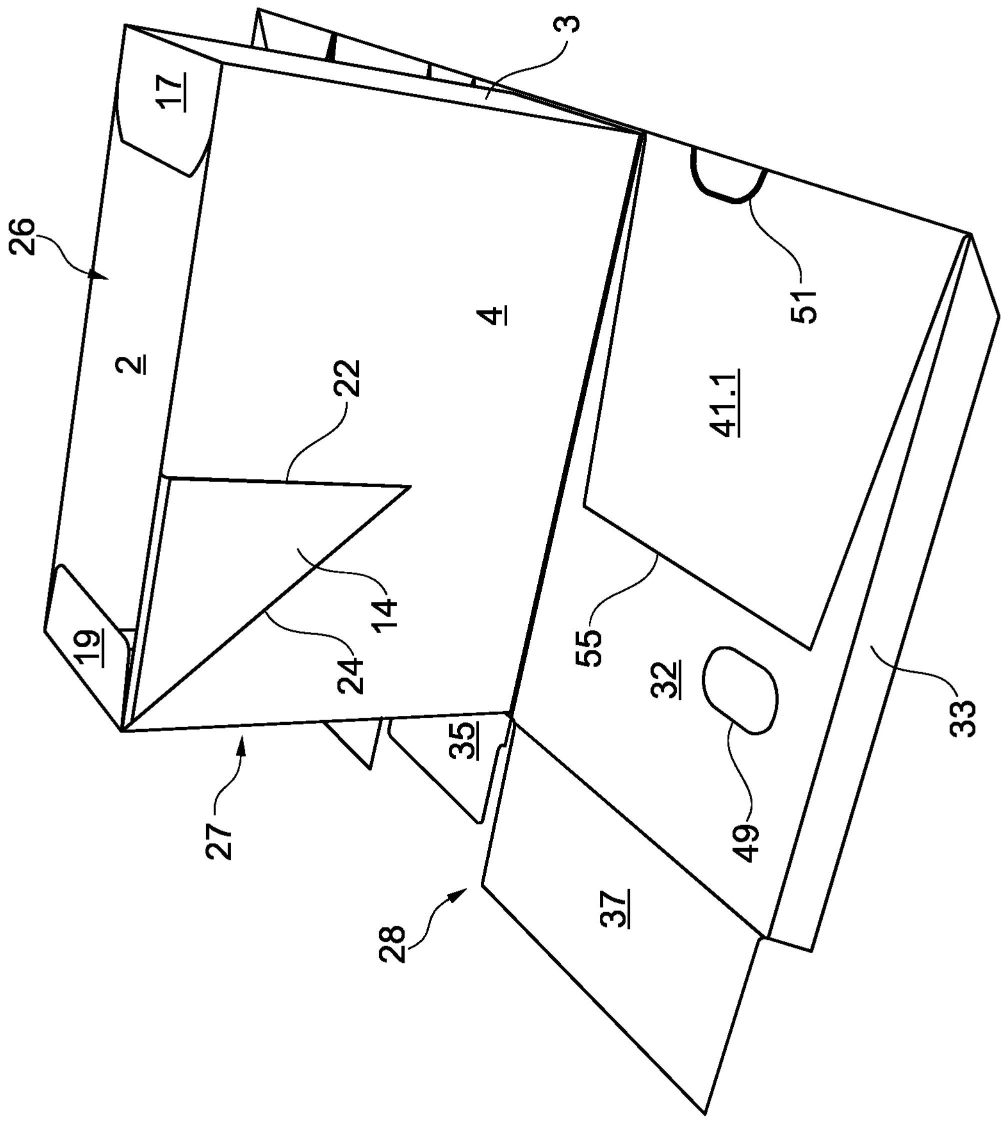
FIGS. 6-8 are views showing the erection of the outer construct from the folded blank of FIG. 5 around the inner construct of FIG. 3 to form a carton according to exemplary embodiments of the disclosure.

According to FIG. 6, during packaging, the erected inner construct 27 can be placed on the pre-glued, flatly spread second blank 28. For example, the bottom wall 25 of the inner construct 27 can be positioned on the outer panel 31 of the outer construct 57 with the inner panel 5 of the inner construct 27 proximate to the end dust flap 35 of the outer construct 57. Before or after this, the inner construct 27 can be filled with product (e.g., one or more products). As shown in FIG. 6, the top dust flap 17 and the inner stop flap 19 can be folded to extend along the first opening 26.

Figure 7:
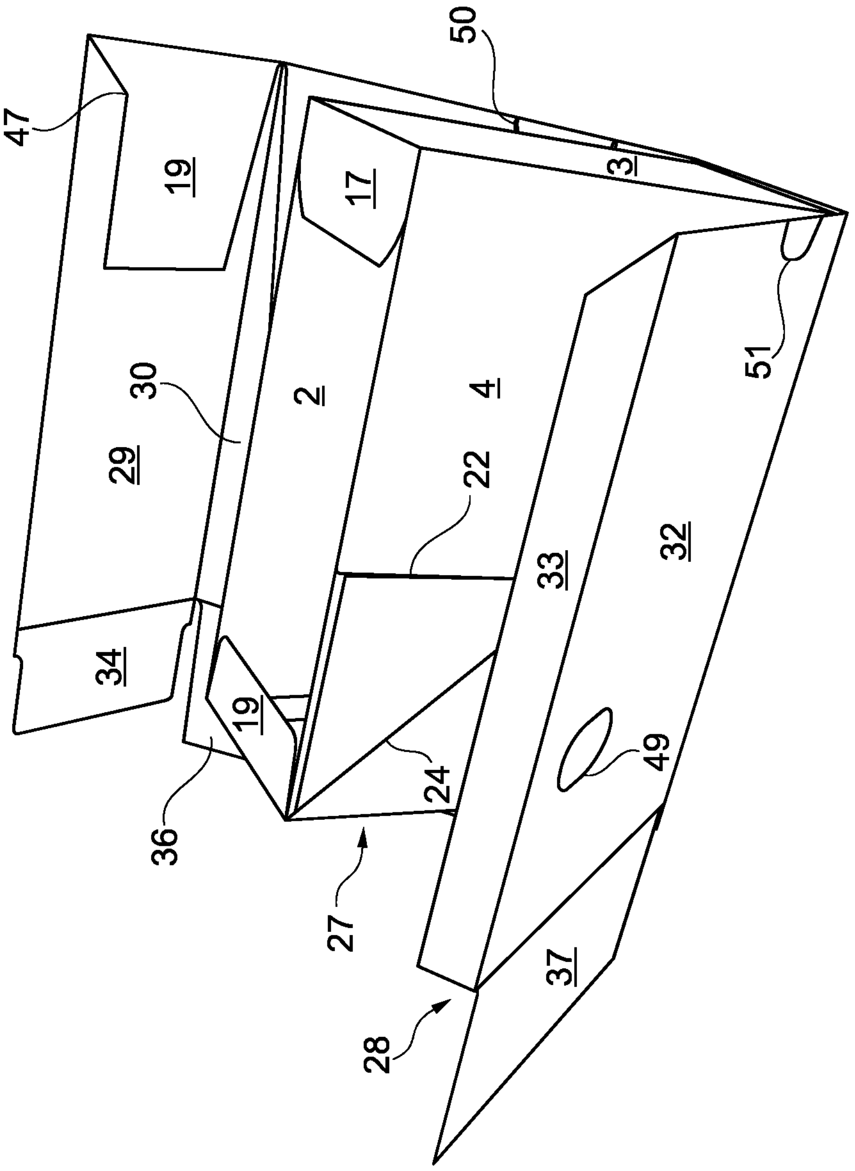
Figure 8:
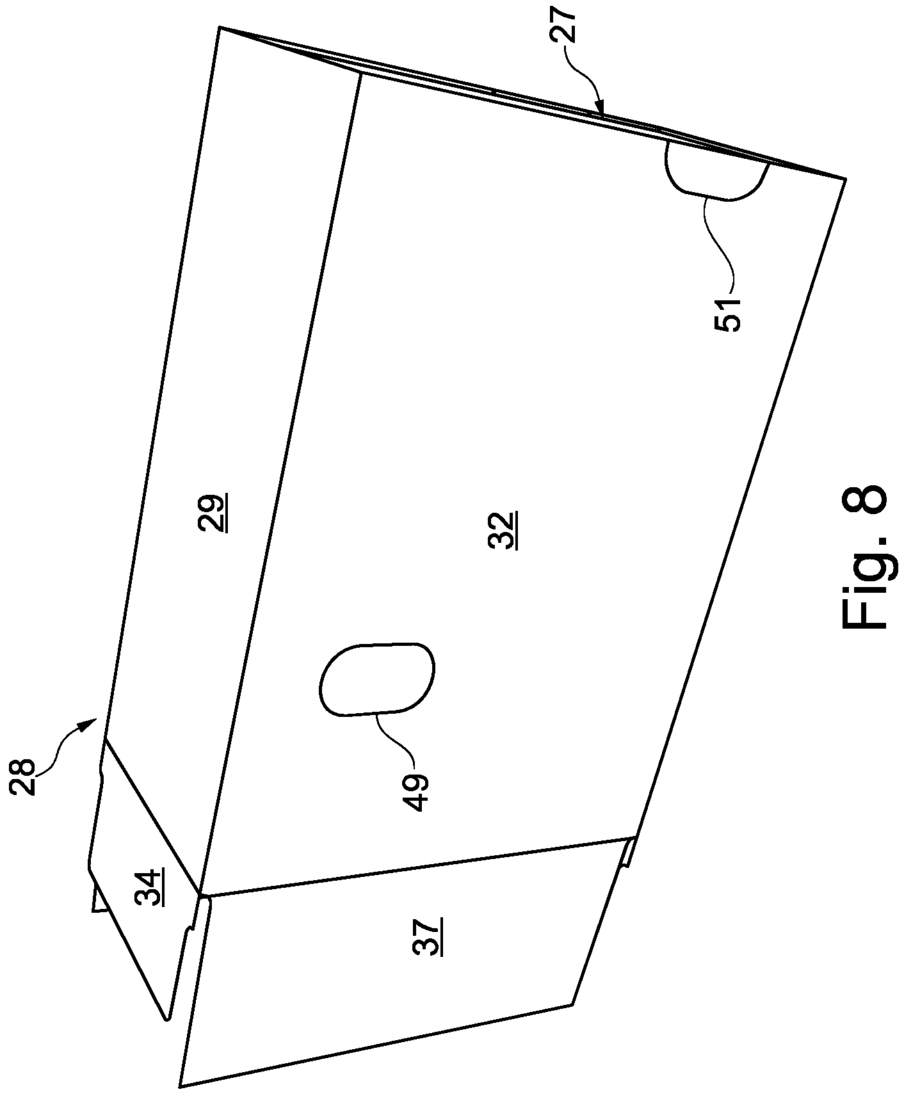

As shown in FIG. 7, the outer panels 29, 30, 31, 32 of the second blank 28 then can be wrapped around the inner construct 27, the outer attachment flap 33 and the outer panel 29 are folded over the first opening 26 and glued together in an overlap area. In embodiments, the recess 47 can accommodate a portion of the outer attachment flap 33. Furthermore, the proximal outer locking portions 40.1, 41.1 of the respective outer locking tabs 40, 41 can be glued to the outer sides of the inner panels 2, 4 within the areas bounded by the lines of weakening 50, 51 (e.g., along the portions of the tear-away panels 50*a*, 51*a* in the proximal outer locking portions 40.1, 41.1). This condition is shown by way of example in FIG. 8. In the illustrated embodiments, the outer panels 30, 32 can at least partially overlap the respective inner panels 2, 4 so that the apertures 48, 49 are aligned with the respective inner locking tabs 13, 14 (e.g., the inner locking tabs 13, 14 extend along the respective apertures 48, 49 in the respective outer panels 30, 32). In embodiments, the inner locking tab 13 and the outer locking tab 40 can extend between the outer panel 30 and the inner panel 2 (e.g., the locking tabs 13, 40 can at least partially overlap the inner panel 2 and the outer panel 30 can at least partially overlap the locking tabs 13, 40), and the inner locking tab 14 and the outer locking tab 41 can extend between the outer panel 32 and the inner panel 4 (e.g., the locking tabs 14, 41 can at least partially overlap the inner panel 4 and the outer panel 32 can at least partially overlap the locking tabs 14, 41).

Figure 9:
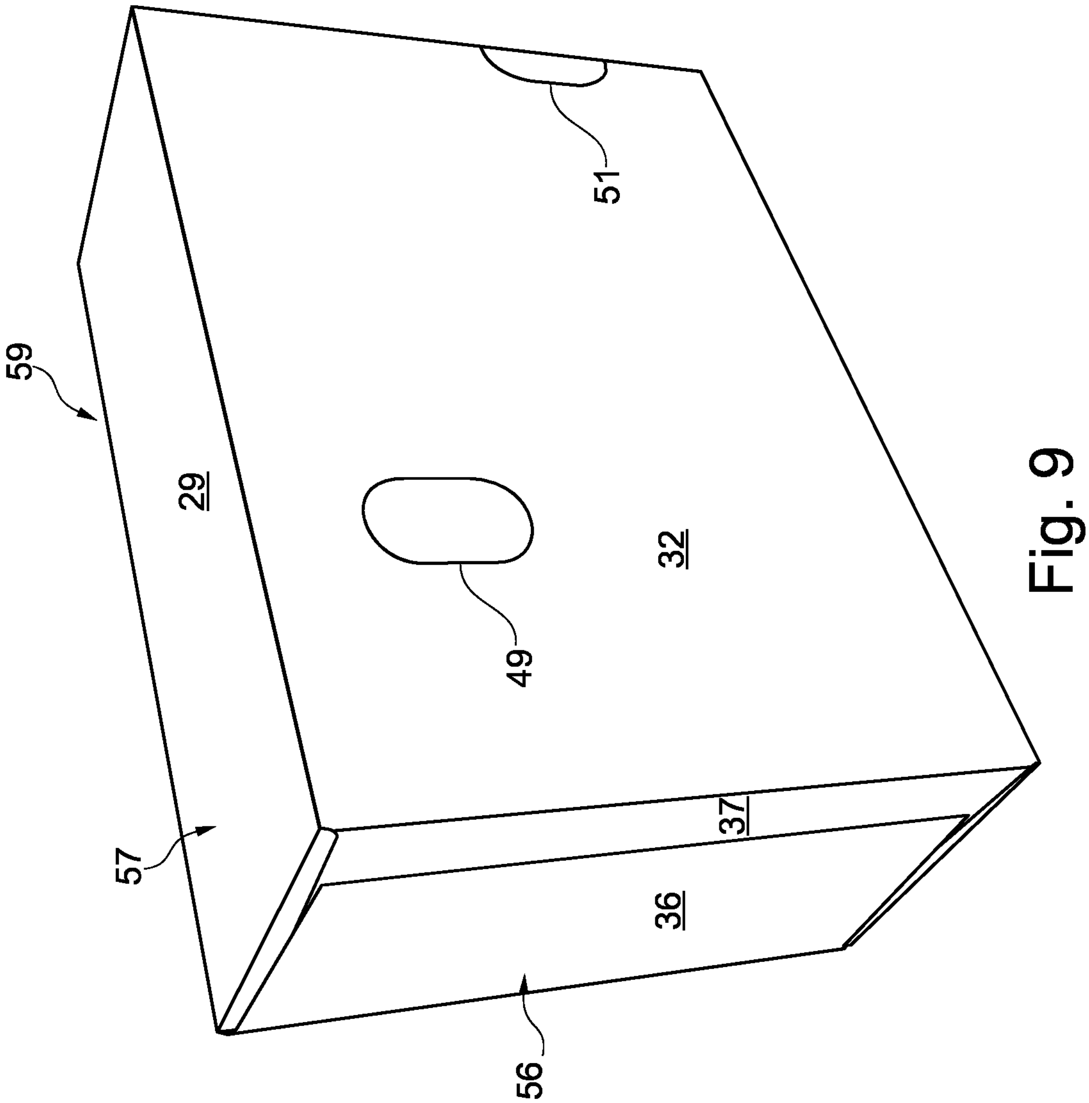
FIGS. 9 and 10 are views of the erected telescope carton or box with outer construct and inner construct arranged therein according to exemplary embodiments of the disclosure.
Figure 10:
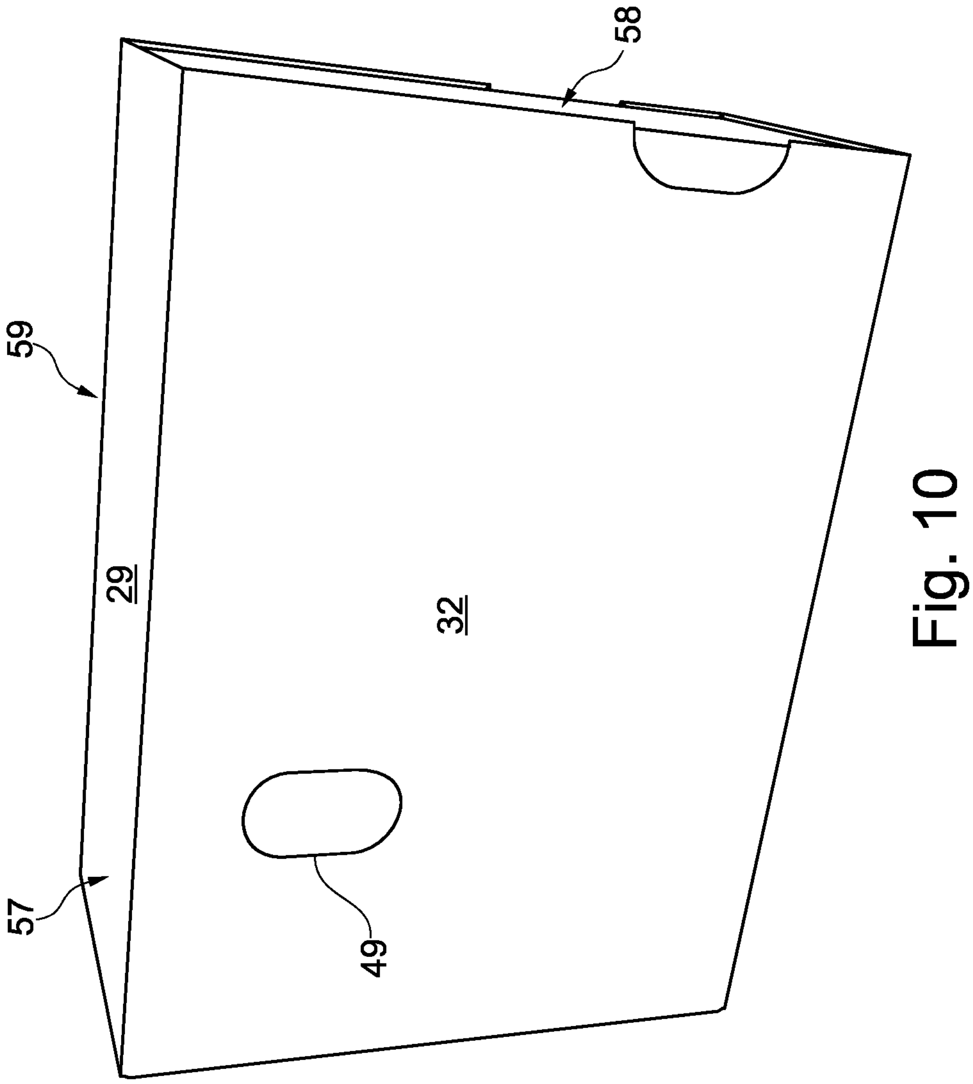
Figure 11:
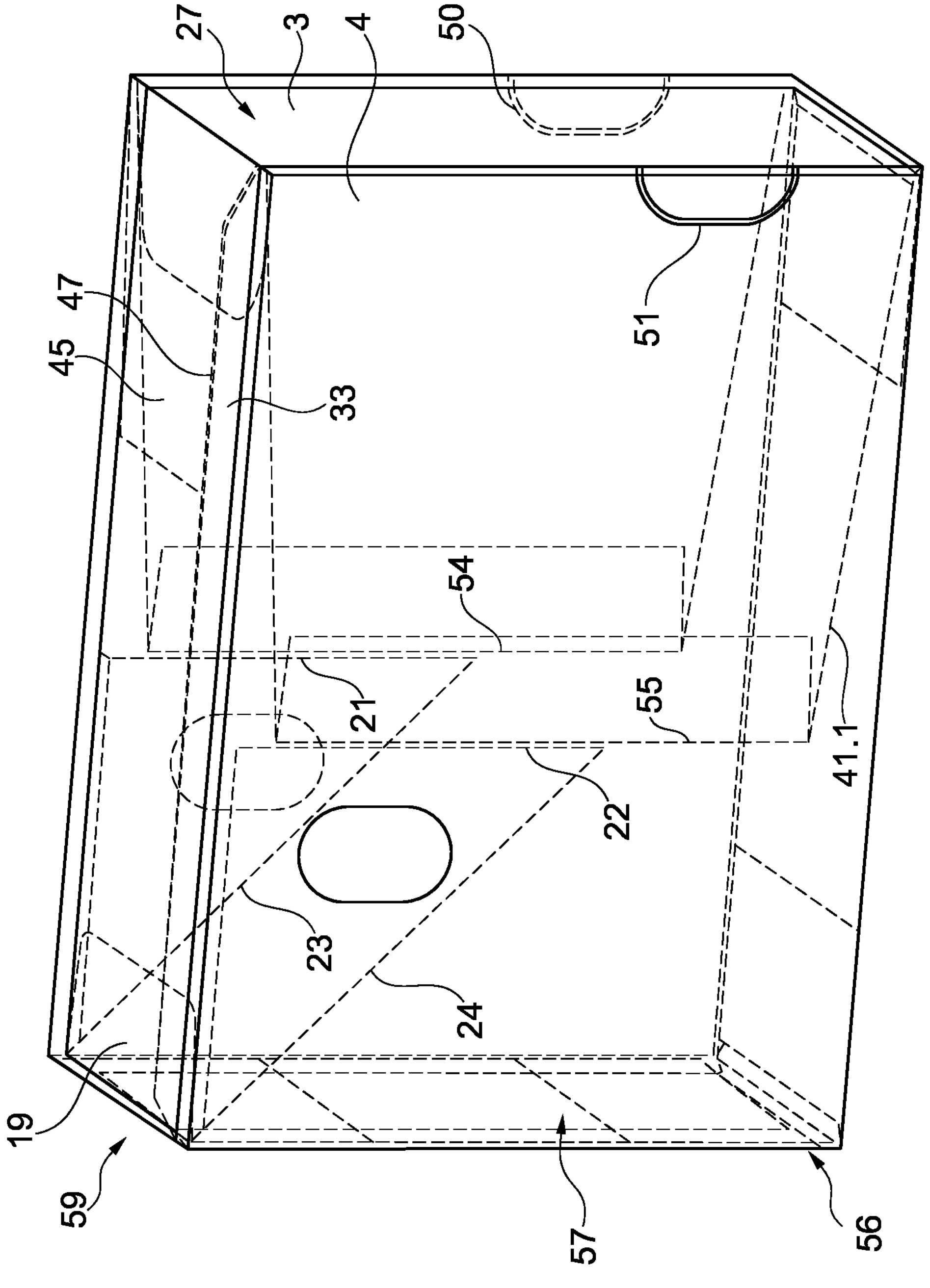
FIG. 11 is a view of the telescope carton of FIGS. 9 and 10 in a perspective X-ray image (wireframe) with the inner part and outer part interlocked according to exemplary embodiments of the disclosure.
Figure 12:
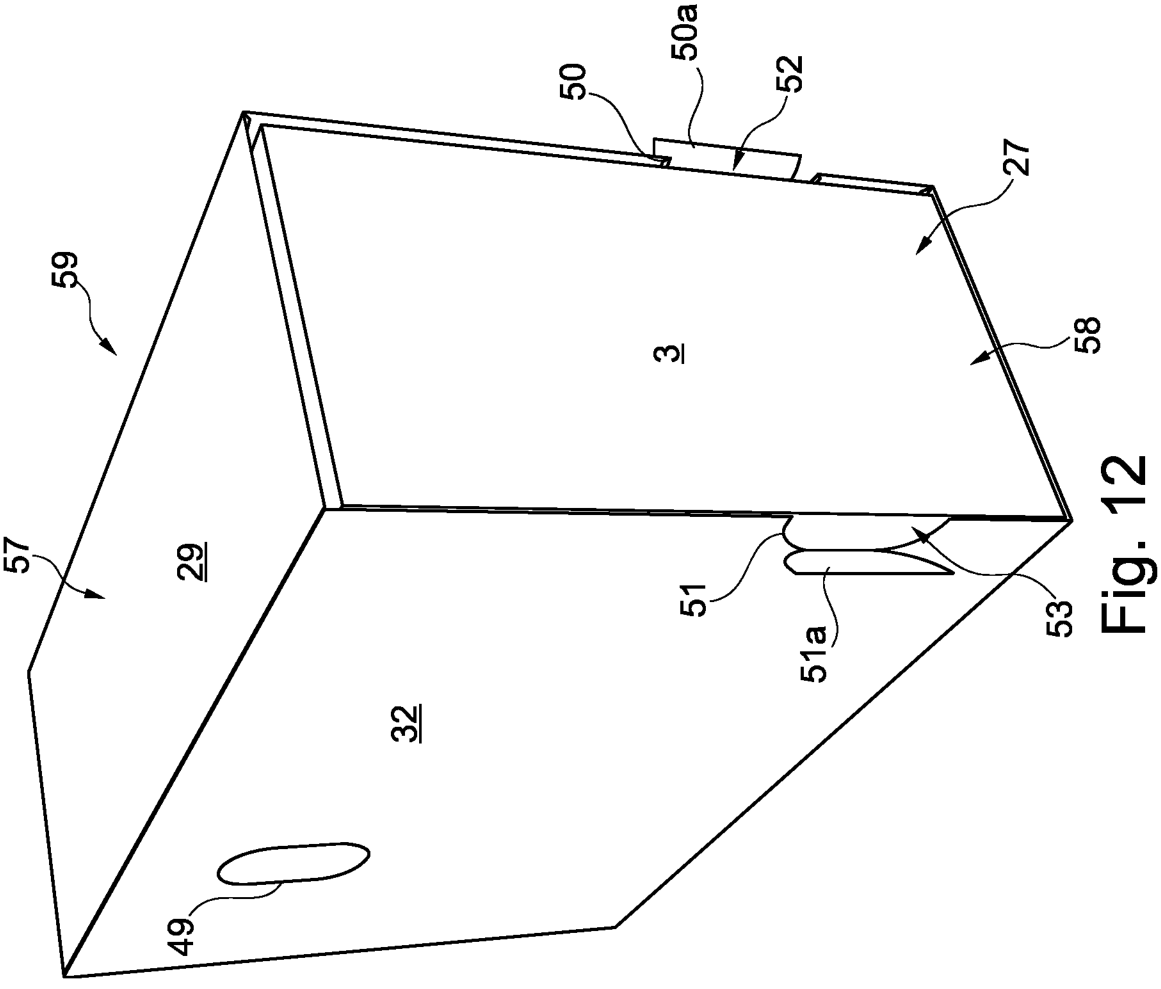
FIG. 12 is a perspective view of the telescope carton of FIGS. 9-11 with an initial opening protection opened according to exemplary embodiments of the disclosure.
Figure 14:
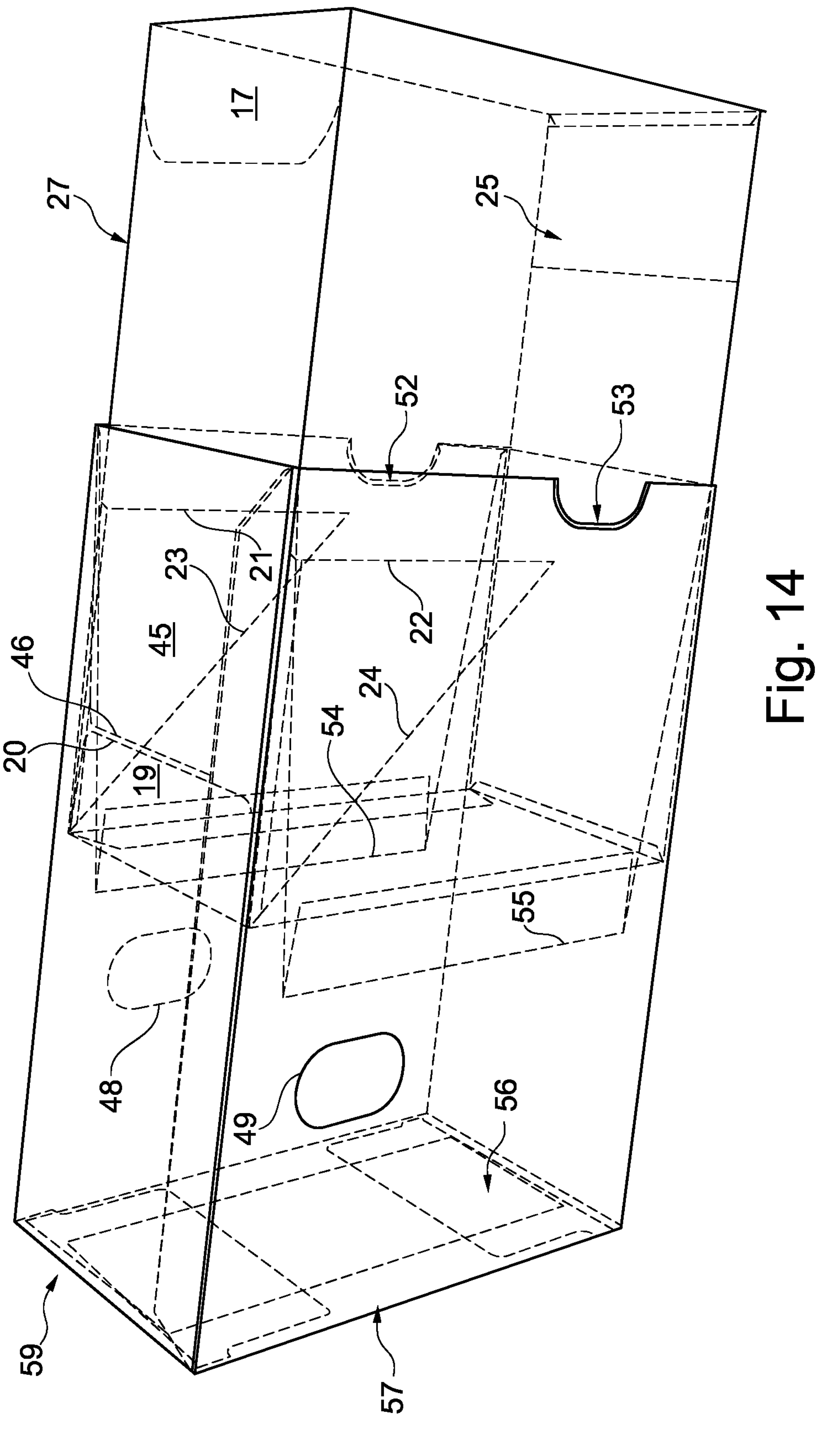
FIG. 14 is a view of the carton in the state from FIG. 13 in a perspective X-ray image (wireframe image) according to exemplary embodiments of the disclosure.

As shown in FIG. 9, the end dust flaps 34, 35 can folded against the inner panel 5 of the inner construct 27 and the end flaps 36, 37 can be folded against the outer sides of the end dust flaps 34, 35 to at least partially close the end of the outer construct 57 and to at least partially form an end wall 56 of the outer construct 57. In exemplary embodiments, the end flaps 36, 37 can be glued to the end dust flaps 34, 35. The cover or end wall 56 is thereby formed and the outer part/construct 57 is erected according to embodiments. At the opposite end of the outer construct 57, as shown in FIGS. 10-12, the edges of the outer panels 29, 30, 31, 32 can extend along and can at least partially define the second opening 58 in the outer construct 57. In exemplary embodiments, the inner panel 3 of the inner construct 27 can extend along or proximate to the second opening 58 of the outer construct 57. As shown in FIGS. 7, 11, and 14, the outer locking tabs 40, 41 are foldably connected to the respective outer panels 30, 32 along the second opening 58 (e.g., the fold lines 38, 39 can extend along the second opening 58).

The telescope carton or box 59 is shown in its erected state in FIGS. 9 and 10. As shown in FIG. 11, the inner locking edges 21, 22 can face the respective outer locking edges 54, 55 so that attempting to moving the inner construct 27 relative to the outer construct 57 through the second opening 58 can cause the inner locking edges 21, 22 and the respective outer locking edges 54, 55 to engage (e.g., contact, abut, interact, etc.). For example, the locking edges 21, 22, 54, 55 can extend perpendicular to a plane of the first opening 26 and the bottom wall 25 of the inner construct 27 and can extend parallel to a plane of the second opening 58 and the end wall 56 of the outer construct 57. The carton 59 could be otherwise formed and/or erected without departing from the disclosure. For example, the outer construct 57 could be formed separate from the inner construct 27, and the inner construct 27 could be inserted into the outer construct 57 through the second opening 58.

In embodiments, the gluing of the tear-away panels 50*a*, 51*a* of the outer construct 57 to the inner panels 2, 4 of the inner construct 27 can provide a first opening protection for the carton 59. For example, the inner construct 27 can be secured (e.g., glued) to the outer construct 57 at the tear-away panels 50*a*, 51*a* to resist or prevent movement between the constructs 27, 57. As shown in FIG. 12, when the tear-away panels 50*a*, 51*a* are broken away from the respective outer panels 30, 32 and the respective proximal outer locking portions 40.1, 41.1 along the respective lines of weakening, the inner construct 27 can be freed from the glued connection to the outer construct 57.

Moreover, as can be seen from FIG. 11, the abutment of the inner locking edges 21, 22 against the respective outer locking edges 54, 55 can limit or prevent relative movement between the constructs 27, 57 to limit or prevent undesired extraction of the inner construct 27 from the second opening 58 of the outer construct 57. Accordingly, in embodiments, the inner locking tabs 13, 14 can engage the respective outer locking tabs 40, 41 (e.g., along the respective locking edges 21, 22 and 54, 55) so that the locking tabs 13, 14, 40, 41 cooperate to limit movement of the inner construct 27 relative to the outer construct 57 through the second opening 58.

Figure 13:
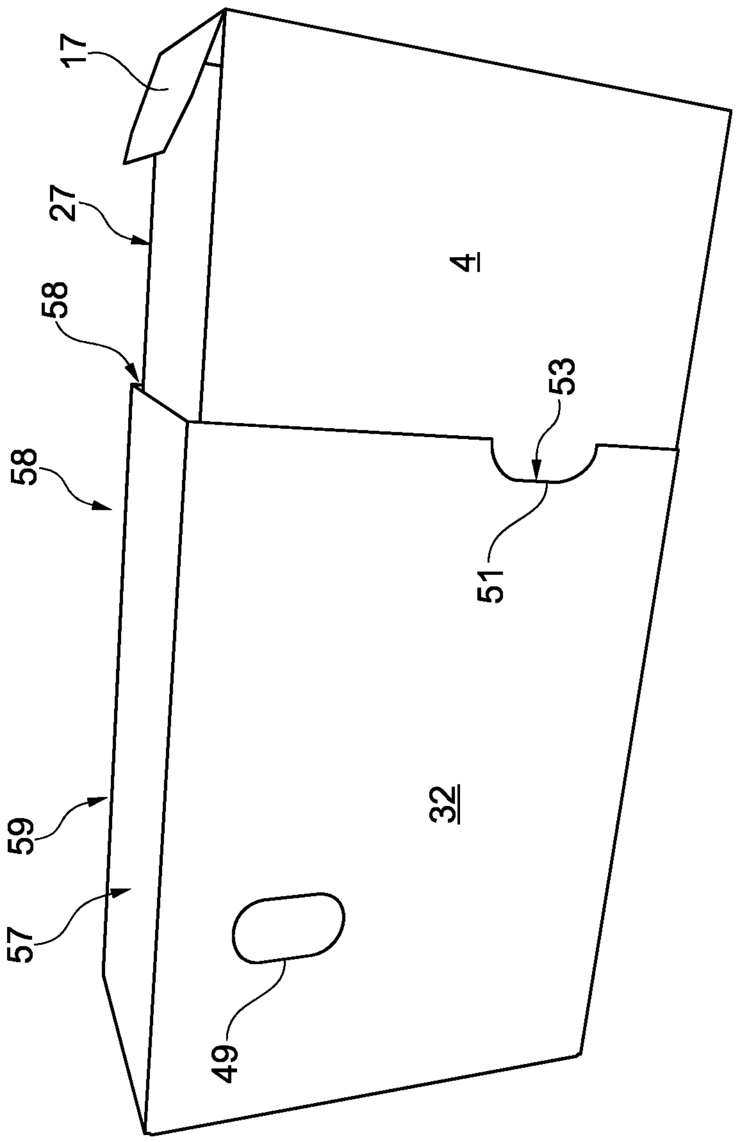
FIG. 13 is a perspective view of the telescope carton of FIG. 12 with the inner construct pulled partially out of the outer construct according to exemplary embodiments of the disclosure.

In the illustrated embodiments, the carton 59 can be manipulated so that the inner construct 27 can be moved from the first (e.g., closed) position (e.g., wherein the inner construct 27 is partially or fully contained within the outer construct 57 with the first opening 26 covered by the outer construct 57, e.g., by the outer panel 29) to the second (e.g., open) position (e.g., wherein the inner construct 27 partially extends through the second opening 58 so that the first opening 26 is accessible). For example, to pull the inner part 27 out of the outer part 57, a user can press the inner panels 2, 4 together slightly with the thumb and index finger of one hand through the first engagement holes 48, 49 so that the inner engagement edges 21, 22 come free from the outer engagement edges 54, 55. With the thumb and index finger of the other hand, the user can grasp an edge portion of the inner member 27 through the second engagement recesses 52, 53 and pull the inner construct 27 partially out of the outer member 57 through the second opening 58. The pull-out can be finally limited by abutment of the inner stop edge 20 of the inner stop flap 19 against the outer stop edge 46 of the outer stop flap 45, as shown in FIGS. 13 and 14. Accordingly, in embodiments, the stop flaps 19, 45 can cooperate to limit or prevent further movement of the inner construct 27 out of the second opening 58 of the outer construct 57.

After removing product, the user can close the telescope carton 59 again by pushing the inner part 27 into the outer part 57. Here, due to the inclined insertion edges 23, 24 of the inner locking tabs 13, 14, the friction between the inner part 27 and the outer part 57 increases only gradually, facilitating the insertion and causing a secure locking of the locking edges 21, 22, 54, 55. The locked carton 59 is again protected against unwanted opening (e.g., by children) with the inner construct 27 in the first position (FIGS. 9-12).

In exemplary embodiments, the shortest distance of the engagement apertures 48, 49 and/or the recesses 52, 53 from each other along the outer sides of the upper part and/or the lower part is dimensioned such that it is difficult or impossible for a child (e.g., with an age of up to three years, of up to four years, of up to five years, of up to six years, etc.) to unlock the carton 59, and it is difficult or impossible to pull the outer construct 57 and inner construct 27 apart when in the locked configuration. In embodiments, this dimensioning is based on average body measurements of a child in the EU, regardless of gender, in the respective age group. In examples, the distance between the outer sides of the second side walls can be about 50 to about 120 mm, about 70 to about 100 mm, or about 80 to about 90 mm. This can help ensure that a child's hands cannot engage in all the engagement holes simultaneously in order to unlock the folding carton, while an adult (e.g., who may have larger hands) is able to reach the locking features to unlock and open the carton 59.

In the telescope carton 59 according to the present disclosure, the inner locking tabs 13, 14 and the outer locking tabs 40, 41 form an interlock when the inner construct 27 is moved into the outer construct 57. This is because the inner locking edges 21, 22 then bear against the outer locking edges 54, 55 so that they prevent the inner construct 27 from being pulled out of the outer construct 57. Pulling the inner construct 27 out of the outer construct 57 can require, for example, that the interlock between the outer part and the inner part be released. To do this, the user can use the thumb and index finger of one hand to engage the engagement openings 48, 49 and compress the inner locking tabs 13, 14 slightly so that the outer locking edges 54, 55 no longer block the path of the inner locking edges 21, 22. With the thumb and index finger of the other hand, the user can grip a portion of the inner construct 27 (e.g., along the inner panel 3) through the second engagement openings/recesses 52, 53 and pull the inner construct 27 and outer construct 57 apart. In doing so, the inner locking tabs 13, 14 slide past the user's thumb and index finger that engage the first engagement apertures 48, 49 and compress the first locking tabs 13, 14 slightly. Unlocking by a child may be prevented or made difficult by sizing the carton so that the child, due to the comparatively small size of his or her hands, is not able to engage in the engagement openings 48, 49 in the manner described. Unlocking can require, for example, a certain understanding of the function of the latch, which is usually not yet present in a child up to the age of six, for example. As a result, a child is prevented from unlocking the telescope carton 59 according to the disclosure and is protected from the associated dangers. In addition, the telescope carton 59 is protected against unintentional opening, which can occur with a telescope carton that does not include the locking features, for example, if it is lifted at the outer construct without supporting the inner construct, so that the inner construct slips out of the outer construct.

In embodiments, the insertion edges 23, 24 of the inner locking tabs 13, 14, which are inclined at an acute angle to the top wall of the carton, can help reduce the initial frictional resistance when the inner construct 27 is inserted into the outer construct 57 and can facilitate insertion of the inner construct 272 into the outer construct 57. During insertion, the frictional resistance gradually increases so that the outer construct 57 fits tightly against the inner construct 27 and securely locks the first and second locking edges 21, 22, 54, 55 together. This provides reliable protection against unintentional opening, even when tolerances are taken into account when producing the blanks and erecting and gluing the telescope carton. In embodiments, the inclined insertion edges can facilitate improved sheet utilization and material-saving production of the carton. In exemplary embodiments, the second folding lines 15, 16 can run at an acute angle to the grain direction of the flat material of the inner construct 27, e.g., when the grain direction is perpendicular to the folding lines 3*a*, 4*a*, 5*a* between the inner panels 2, 3, 4, 5 or the inner panels 2, 3, 4, 5 and the bottom wall 25. As a result, the restoring force in the flat material can be greater at the second fold lines 15, 16, so that it builds up more in the overlap area of the proximal and distal inner locking portions of the inner locking tabs 13, 14. This can help compensate for tolerances between the inner construct 27 and outer construct 57 and can help promote secure locking of the inner construct 27 and outer construct 57.

In embodiments of the telescope carton 59 according to the disclosure, initial opening protection is achieved by bonding the outer side panels 30, 32 to the inner side panels 2, 4 in the area defined by the weakening lines 50, 51 (e.g., along the tear-away panels 50*a*, 51*a*). For example, only by tearing along the lines of weakness 50, 51 is it possible to open the telescope carton 59 for the first time. To do this, the user can use the thumb and forefinger of one hand to slightly compress the areas bounded by the lines of weakness 50, 51 (e.g., the tear-away panels 50*a*, 51*a*), thereby breaking the lines of weakness 50, 51, and then use the same hand to pull the inner construct 27 out of the outer construct 57 while holding the outer construct 57 with the other hand (e.g., at the apertures 48, 49 while pressing inwardly on the inner locking tabs 13, 14 as described above). Initial opening by a child can be prevented by dimensioning the telescope carton 59 in such a way that the child, due to the comparatively small size of his or her hands, is not able to break open the weakening lines 50, 51 in the manner described. For this purpose, the tear-away panels 50*a*, 51*a* can also be dimensioned (e.g., spaced apart) in such a way that they cannot be broken open by a child. In addition, initial opening requires a certain understanding of initial opening protection, which is usually not yet present in a child up to the age of six, for example. As a result, a child can be prevented from first opening the telescope carton 59 according to the disclosure and is protected from the associated dangers. In addition, the package is prevented from being opened prior to purchase by an interested consumer. For example, tearing of the lines of weakening 50, 51 can provide a potential purchaser an indication that the package has been accessed or tampered with.

In exemplary embodiments, the carton 59 may have tolerances in its formation, for example, when the constructs 27, 57 are formed from the flat, glued blanks 1, 28 by a packager. These tolerances may lead to small variations in the relative sizes of the constructs 27, 57. However, the two layers of thickness of the inner locking tabs 13, 14 and of the outer locking tabs 40, 41 (e.g., where their respective proximal and distal portions are in overlapping relationships) can help compensate for such tolerances and variations that can occur during the production of the blanks and the erection and bonding of the inner part and/or the outer part. This can be advantageous for secure locking of the telescope carton despite the tolerances.

The blanks according to any of the embodiments of the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the carton to function at least generally as described herein. The blank can also be laminated or coated with one or more sheet-like materials at selected panels or panel sections.

In accordance with the exemplary embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton comprising:

an inner construct comprising a plurality of inner panels extending at least partially around an interior of the inner construct and a first opening for at least partially receiving one or more products in the interior of the inner construct, wherein the inner construct comprises an inner locking tab foldably connected to at least one inner panel of the plurality of inner panels; and an outer construct comprising a plurality of outer panels extending at least partially around at least a portion of the inner construct and a second opening, wherein the outer construct comprises an outer locking tab foldably connected to at least one outer panel of the plurality of outer panels;

wherein the inner locking tab and the outer locking tab cooperate to limit movement between the inner construct and the outer construct;

wherein at least the inner locking tab is moveable with respect to the outer locking tab for allowing the inner construct to move relative to the outer construct from a first position at least partially through the second opening to a second position, the inner locking tab comprises a proximal inner locking portion foldably connected to the at least one inner panel and a distal inner locking portion foldably connected to the proximal inner locking portion, and the proximal inner locking portion and the distal inner locking portion are in an at least partially overlapping relationship and cooperate to at least partially form an inner locking edge, the outer locking tab comprises a proximal outer locking portion foldably connected to the at least one outer panel and a distal outer locking portion foldably connected to the proximal outer locking portion, and the proximal outer locking portion and the distal outer locking portion cooperate to at least partially form an outer locking edge for engaging the inner locking edge to limit movement of the inner construct with respect to the outer construct.

2. The carton of claim 1, wherein the inner locking tab and the at least one inner panel are in an overlapping relationship, and the outer locking tab and the at least one outer panel are in an overlapping relationship.

3. The carton of claim 1, wherein the inner locking tab and the outer locking tab extend between the at least one outer panel and the at least one inner panel.

4. The carton of claim 1, wherein the inner locking tab is foldably connected to the at least one inner panel along the first opening and the outer locking tab is foldably connected to the at least one outer panel along the second opening.

5. The carton of claim 1, wherein the inner locking edge and the outer locking edge are perpendicular to a plane of the first opening and parallel to a plane of the second opening.

6. The carton of claim 1, wherein the inner construct comprises a bottom wall opposite to the first opening, the outer construct comprises an end wall opposite to the second opening, and the inner locking edge and the outer locking edge are perpendicular to the bottom wall and parallel to the end wall.

7. The carton of claim 1, wherein the inner locking tab is a first inner locking tab, the at least one inner panel comprises a first inner panel, the outer locking tab is a first outer locking tab, the at least one outer panel comprises a first outer panel, the inner construct further comprises a second inner locking tab foldably connected to a second inner panel of the plurality of inner panels, and the outer construct comprises a second outer locking tab foldably connected to a second outer panel of the plurality of outer panels, the second inner locking tab and the second outer locking tab being for cooperating to limit movement between the inner construct and the outer construct.

8. The carton of claim 7, wherein the outer construct comprises a first aperture and a second aperture in the respective first outer panel and second outer panel, the first inner locking tab and the second inner locking tab extend along the respective first aperture and second aperture so that the first inner locking tab and the second inner locking tab are accessible via the respective first aperture and second aperture when the inner construct is in the first position for moving the first inner locking tab and the second inner locking tab inwardly relative to the respective first outer locking tab and second outer locking tab.

9. The carton of claim 8, wherein the first aperture and the second aperture are spaced apart from one another by about 50 mm to about 120 mm.

10. The carton of claim 1, wherein the outer construct comprises an aperture in the at least one outer panel, and the inner locking tab extends along the aperture when the inner construct is in the first position so that the inner locking tab can be engaged via the aperture to move the inner locking tab relative to the outer locking tab.

11. The carton of claim 10, wherein the outer construct further comprises a recess extending in the at least one outer panel and the outer locking tab along the second opening, at least a portion of the inner construct extending along the recess in the outer construct.

12. The carton of claim 1, wherein the outer construct further comprises a tear-away panel that is separable from the at least one outer panel and the outer locking tab along a line of weakening for forming a recess in the at least one outer panel and the outer locking tab along the second opening.

13. The carton of claim 1, wherein the inner locking tab comprises an insertion edge that is oblique with respect to the inner locking edge.

14. The carton of claim 1, wherein respective edges of inner panels of the plurality of inner panels extend along the first opening of the inner construct and respective edges of outer panels of the plurality of outer panels extend along the second opening of the outer construct.

15. The carton of claim 1, wherein the proximal inner locking portion and the distal inner locking portion are foldably connected along an oblique fold line.

16. The carton of claim 1, wherein the at least one inner panel comprises a first inner panel, the inner construct further comprises an inner stop flap foldably connected to a second inner panel of the plurality of inner panels, the at least one outer panel comprises a first outer panel, the outer construct further comprises an outer stop flap foldably connected to a second outer panel of the plurality of outer panels, and the inner stop flap and the outer stop flap are configured for engaging one another when the inner construct is in the second position to limit movement of the inner construct through the second opening of the outer construct.

17. The carton of claim 16, wherein the inner stop flap is foldably connected to the second inner panel along the first opening of the inner construct, the outer stop flap is foldably connected to the second outer panel along the second opening of the outer construct, the second inner panel is spaced apart from the second opening of the outer construct, and the second outer panel extends along at least a portion of the first opening of the inner construct.

18. In combination, a first blank and a second blank for cooperating to at least partially form a carton, the first blank comprising a plurality of inner panels and an inner locking tab foldably connected to at least one inner panel of the plurality of inner panels, wherein the first blank is for forming an inner construct with a first opening for at least partially receiving one or more products in an interior of the inner construct formed from the first blank;

the second blank comprising a plurality of outer panels and an outer locking tab foldably connected to at least one outer panel of the plurality of outer panels, wherein the second blank is for forming an outer construct with the plurality of outer panels at least partially extending around the inner construct formed from the first blank, the outer construct formed from the second blank comprising a second opening;

wherein the inner locking tab and the outer locking tab are configured for selectively cooperating to limit movement between the inner construct formed from the first blank and the outer construct formed from the second blank when the carton is formed from the first blank and the second blank, the inner locking tab comprises a proximal inner locking portion foldably connected to the at least one inner panel and a distal inner locking portion foldably connected to the proximal inner locking portion, and the proximal inner locking portion and the distal inner locking portion are for being folded into an at least partially overlapping relationship and are for cooperating to at least partially form an inner locking edge when the inner construct is formed from the first blank, the outer locking tab comprises a proximal outer locking portion foldably connected to the at least one outer panel and a distal outer locking portion foldably connected to the proximal outer locking portion, and the proximal outer locking portion and the distal outer locking portion are for cooperating to at least partially form an outer locking edge when the outer construct is formed from the second blank, the outer locking edge being for engaging the inner locking edge to limit movement of the inner construct with respect to the outer construct when the carton is formed from the first blank and the second blank.

19. The combination of claim 18, wherein the inner locking tab is configured for being folded into an overlapping relationship with the at least one inner panel when the inner construct is formed from the first blank, and the outer locking tab is configured for being folded into an overlapping relationship with the at least one outer panel when the outer construct is formed from the second blank.

20. The combination of claim 18, wherein the inner locking tab is foldably connected to the at least one inner panel along a first fold line that extends along the first opening when the inner construct is formed from the first blank, and the outer locking tab is foldably connected to the at least one outer panel along a second fold line that extends along the second opening when the outer construct is formed from the second blank.

21. The combination of claim 18, wherein the inner locking tab is a first inner locking tab, the at least one inner panel comprises a first inner panel, the outer locking tab is a first outer locking tab, the at least one outer panel comprises a first outer panel, the inner construct further comprises a second inner locking tab foldably connected to a second inner panel of the plurality of inner panels, and the outer construct comprises a second outer locking tab foldably connected to a second outer panel of the plurality of outer panels, the second inner locking tab and the second outer locking tab being for cooperating to limit movement between the inner construct and the outer construct when the carton is formed from the first blank and the second blank.

22. The combination of claim 21, wherein the outer construct comprises a first aperture and a second aperture in the respective first outer panel and second outer panel, the first aperture and the second aperture being positioned in the respective first outer panel and second outer panel for being aligned with the respective first inner locking tab and second inner locking tab when the carton is formed from the first blank and the second blank.

23. The combination of claim 22, wherein the first aperture and the second aperture are spaced apart from one another by about 50 mm to about 120 mm when the outer construct is formed from the second blank.

24. The combination of claim 18, wherein the outer construct comprises an aperture in the at least one outer panel, the aperture being positioned in the at least one outer panel for being aligned with the inner locking tab when the carton is formed from the first blank and the second blank.

25. The combination of claim 18, wherein the second blank further comprises a tear-away panel that is separable from the at least one outer panel and the outer locking tab along a line of weakening for forming a recess in the at least one outer panel and the outer locking tab along the second opening when the outer construct is formed from the second blank.

26. The combination of claim 18, wherein the proximal inner locking portion and the distal inner locking portion are foldably connected along an oblique fold line.

27. The combination of claim 26, wherein the oblique fold line is for forming an insertion edge that is oblique with respect to the inner locking edge when the inner construct is formed from the first blank.

28. The combination of claim 18, wherein the at least one inner panel comprises a first inner panel, the inner construct further comprises an inner stop flap foldably connected to a second inner panel of the plurality of inner panels, the at least one outer panel comprises a first outer panel, the outer construct further comprises an outer stop flap foldably connected to a second outer panel of the plurality of outer panels, and the inner stop flap and the outer stop flap are configured for engaging one another to limit movement of the inner construct through the second opening of the outer construct when the carton is formed from the first blank and the second blank.

29. The combination of claim 28, wherein the inner stop flap is foldably connected to the second inner panel along the first opening when the inner construct is formed from the first blank, the outer stop flap is foldably connected to the second outer panel along the second opening when the outer construct is formed from the second blank.

30. A method of forming a carton, the method comprising:

obtaining a first blank comprising a plurality of inner panels and an inner locking tab foldably connected to at least one inner panel of the plurality of inner panels;

forming an inner construct from the first blank by folding the plurality of inner panels at least partially around an interior of the inner construct, the inner construct comprising a first opening for at least partially receiving one or more products in the interior of the inner construct;

obtaining a second blank comprising a plurality of outer panels and an outer locking tab foldably connected to at least one outer panel of the plurality of outer panels;

forming an outer construct from the second blank by folding the plurality of outer panels at least partially around the inner construct, the outer construct comprising a second opening;

wherein the inner locking tab and the outer locking tab cooperate to limit movement between the inner construct and the outer construct;

wherein at least the inner locking tab is moveable with respect to the outer locking tab for allowing the inner construct to move relative to the outer construct from a first position at least partially through the second opening to a second position, the inner locking tab comprises a proximal inner locking portion foldably connected to the at least one inner panel and a distal inner locking portion foldably connected to the proximal inner locking portion, and the forming the inner construct further comprises positioning the proximal inner locking portion and the distal inner locking portion in an at least partially overlapping relationship so that the proximal inner locking portion the distal inner locking portion cooperate to at least partially form an inner locking edge, the outer locking tab comprises a proximal outer locking portion foldably connected to the at least one outer panel and a distal outer locking portion foldably connected to the proximal outer locking portion, and the forming the outer construct further comprises positioning the proximal outer locking portion and the distal outer locking portion in an at least partially overlapping relationship so that the proximal outer locking portion and the distal outer locking portion cooperate to at least partially form an outer locking edge for engaging the inner locking edge to limit movement of the inner construct with respect to the outer construct.

31. The method of claim 30, wherein the forming the inner construct comprises positioning the inner locking tab to be in an overlapping relationship with the at least one inner panel, and the forming the outer construct comprises positioning the outer locking tab to be in an overlapping relationship with the at least one outer panel.

32. The method of claim 30, wherein the outer construct further comprises a tear-away panel that is separable from the at least one outer panel and the outer locking tab along a line of weakening, the method further comprising adhering the tear-away panel to the at least one inner panel.

* * * * *